(12) United States Patent
Barrall

(10) Patent No.: US 7,818,531 B2
(45) Date of Patent: Oct. 19, 2010

(54) STORAGE SYSTEM CONDITION INDICATOR AND METHOD

(75) Inventor: Geoffrey S. Barrall, San Jose, CA (US)

(73) Assignee: Data Robotics, Inc., Santa Clara, CA (US)

( * ) Notice: Subject to any disclaimer, the term of this patent is extended or adjusted under 35 U.S.C. 154(b) by 415 days.

(21) Appl. No.: 11/267,960

(22) Filed: Nov. 4, 2005

(65) Prior Publication Data

US 2006/0129875 A1    Jun. 15, 2006

Related U.S. Application Data

(60) Provisional application No. 60/625,495, filed on Nov. 5, 2004, provisional application No. 60/718,768, filed on Sep. 20, 2005.

(51) Int. Cl.
*G06F 11/30* (2006.01)
*G06F 11/32* (2006.01)

(52) U.S. Cl. ............................ 711/170; 714/48; 714/57

(58) Field of Classification Search ................. 711/170; 714/48, 57
See application file for complete search history.

(56) References Cited

U.S. PATENT DOCUMENTS

| | | | |
|---|---|---|---|
| 3,766,534 A | 10/1973 | Beausoleil et al. | 340/172.5 |
| 4,221,003 A | 9/1980 | Chang et al. | 364/900 |
| 4,288,860 A | 9/1981 | Trost | 364/900 |
| 4,607,346 A | 8/1986 | Hill | 364/900 |
| 4,833,554 A | 5/1989 | Dalziel et al. | 360/98.04 |
| 4,873,672 A | 10/1989 | Etoh et al. | 365/218 |
| 4,914,656 A | 4/1990 | Dunphy et al. | 371/10.2 |
| 4,989,205 A | 1/1991 | Dunphy et al. | 371/10.1 |
| 4,989,206 A | 1/1991 | Dunphy et al. | 371/10.1 |
| 5,077,736 A | 12/1991 | Dunphy et al. | 371/10.1 |
| 5,101,492 A | 3/1992 | Schultz et al. | 395/575 |
| 5,155,835 A | 10/1992 | Belsan | 395/425 |
| 5,193,184 A | 3/1993 | Belsan et al. | 395/600 |
| 5,210,866 A | 5/1993 | Milligan et al. | 395/575 |

(Continued)

FOREIGN PATENT DOCUMENTS

EP    0 426 185 A    5/1991

(Continued)

OTHER PUBLICATIONS

Wilkes et al. "The HP AutoRAID Hierarchical Storage System," Operating Systems Review, ACM, New York, NY, vol. 29, No. 5, pp. 96-108, Dec. 1995.

(Continued)

*Primary Examiner*—Sanjiv Shah
*Assistant Examiner*—Samuel Dillon
(74) *Attorney, Agent, or Firm*—Sunstein Kann Murphy & Timbers LLP

(57) ABSTRACT

A storage system condition indicator and method provides a visual display representing the operating condition of a set of storage devices. Various operating conditions may be defined based on available storage capacity and capacity to store data redundantly. One or more indicators may be used to represent the operating condition of the set of storage devices. The indicator(s) may be used to indicate whether additional storage capacity is recommended and, in a storage array, which slot in the array should be updated with additional storage capacity.

6 Claims, 21 Drawing Sheets b) Slot C & Slot D full - data not redundant: Add drive to empty Slot A

U.S. PATENT DOCUMENTS

| | | | |
|---|---|---|---|
| 5,239,659 A | 8/1993 | Rudeseal et al. | 395/800 |
| 5,257,379 A | 10/1993 | Cwiakala et al. | 395/700 |
| 5,269,011 A | 12/1993 | Yanai et al. | 395/425 |
| 5,291,456 A | 3/1994 | Sugino | 365/230.01 |
| 5,317,728 A | 5/1994 | Tevis et al. | 395/600 |
| 5,325,505 A | 6/1994 | Hoffecker et al. | 395/425 |
| 5,345,584 A | 9/1994 | Hill | 395/600 |
| 5,381,539 A | 1/1995 | Yanai et al. | 395/425 |
| 5,392,244 A | 2/1995 | Jacobson et al. | 365/200 |
| 5,410,737 A | 4/1995 | Jones | 455/56.1 |
| 5,454,080 A | 9/1995 | Fasig et al. | 395/283 |
| 5,463,772 A | 10/1995 | Thompson et al. | 707/101 |
| 5,463,776 A | 10/1995 | Voigt et al. | 395/600 |
| 5,467,449 A * | 11/1995 | Gauronski et al. | 714/57 |
| 5,479,653 A | 12/1995 | Jones | 395/182.03 |
| 5,490,248 A | 2/1996 | Dan et al. | 395/182.04 |
| 5,524,204 A | 6/1996 | Verdoorn, Jr. | 395/182.04 |
| 5,535,335 A * | 7/1996 | Cox et al. | 709/221 |
| 5,537,534 A | 7/1996 | Voigt et al. | 395/182.04 |
| 5,542,065 A | 7/1996 | Burkes et al. | 395/441 |
| 5,546,558 A | 8/1996 | Jacobson et al. | 395/441 |
| 5,548,712 A | 8/1996 | Larson et al. | 395/182.05 |
| 5,568,629 A | 10/1996 | Gentry et al. | 395/441 |
| 5,596,736 A | 1/1997 | Kerns | 395/404 |
| 5,604,902 A | 2/1997 | Burkes et al. | 707/206 |
| 5,615,352 A | 3/1997 | Jacobson et al. | 395/441 |
| 5,664,187 A | 9/1997 | Burkes et al. | 395/621 |
| 5,666,512 A | 9/1997 | Nelson et al. | 711/114 |
| 5,696,934 A | 12/1997 | Jacobson et al. | 395/441 |
| 5,825,616 A | 10/1998 | Howell et al. | 361/684 |
| 5,832,235 A | 11/1998 | Wilkes | 709/247 |
| 5,864,655 A | 1/1999 | Dewey et al. | 395/182.05 |
| 5,873,118 A | 2/1999 | Letwin | 711/156 |
| 5,881,311 A | 3/1999 | Woods | 395/824 |
| 5,896,256 A * | 4/1999 | Lang et al. | 360/133 |
| 5,986,881 A | 11/1999 | Yang | 361/685 |
| 6,009,478 A | 12/1999 | Panner et al. | 710/5 |
| 6,032,148 A | 2/2000 | Wilkes | 707/101 |
| 6,034,687 A * | 3/2000 | Taylor et al. | 715/775 |
| 6,052,759 A | 4/2000 | Stallmo et al. | 711/114 |
| 6,058,489 A | 5/2000 | Schultz et al. | 714/7 |
| 6,118,924 A | 9/2000 | Nakatani et al. | 386/70 |
| 6,119,174 A | 9/2000 | Borowsky et al. | 710/15 |
| 6,151,685 A | 11/2000 | Li et al. | 714/6 |
| 6,199,178 B1 | 3/2001 | Schneider et al. | 714/21 |
| 6,253,300 B1 | 6/2001 | Lawrence et al. | 711/173 |
| 6,301,605 B1 | 10/2001 | Napolitano et al. | 709/205 |
| 6,321,317 B1 | 11/2001 | Borowsky et al. | 711/170 |
| 6,370,604 B1 | 4/2002 | Sreekanti | 710/103 |
| 6,408,400 B2 | 6/2002 | Taketa et al. | 714/5 |
| 6,418,449 B1 | 7/2002 | Chen et al. | 707/104.1 |
| 6,477,544 B1 | 11/2002 | Bolosky et al. | 707/200 |
| 6,546,499 B1 | 4/2003 | Challener et al. | 714/6 |
| 6,591,338 B1 | 7/2003 | Horst et al. | 711/114 |
| 6,606,585 B1 | 8/2003 | Borowsky et al. | 703/2 |
| 6,606,651 B1 | 8/2003 | Linde | 709/216 |
| 6,615,365 B1 | 9/2003 | Jenevein et al. | 714/6 |
| 6,644,556 B2 * | 11/2003 | Adelmann | 235/492 |
| 6,651,137 B2 * | 11/2003 | Baek et al. | 711/114 |
| 6,684,312 B1 * | 1/2004 | Murayama et al. | 711/170 |
| 6,693,766 B1 | 2/2004 | Wilkes et al. | 360/78.08 |
| 6,694,339 B1 | 2/2004 | Hirose et al. | 707/203 |
| 6,711,676 B1 * | 3/2004 | Zomaya et al. | 713/100 |
| 6,728,837 B2 | 4/2004 | Wilkes et al. | 711/133 |
| 6,745,284 B1 | 6/2004 | Lee et al. | 711/114 |
| 6,754,664 B1 * | 6/2004 | Bush | 1/1 |
| 6,754,767 B2 * | 6/2004 | Gold | 711/114 |
| 6,851,024 B1 | 2/2005 | Wilkes et al. | 711/133 |
| 6,857,011 B2 | 2/2005 | Reinke | 709/220 |
| 6,862,151 B2 | 3/2005 | Hoskins et al. | 360/53 |
| 6,862,609 B2 | 3/2005 | Merkey | 709/214 |
| 6,865,527 B2 | 3/2005 | Go et al. | 703/22 |
| 6,907,500 B2 | 6/2005 | Suzuki et al. | 711/114 |
| 6,934,673 B2 | 8/2005 | Alvarez et al. | 703/21 |
| 6,978,259 B1 | 12/2005 | Anderson et al. | 706/19 |
| 6,990,547 B2 | 1/2006 | Ulrich et al. | 710/304 |
| 7,072,910 B2 | 7/2006 | Kahn et al. | 707/201 |
| 7,103,798 B2 | 9/2006 | Moreita | 714/6 |
| 7,188,212 B2 | 3/2007 | Hajji | 711/114 |
| 7,216,251 B2 | 5/2007 | Gaunt et al. | 714/6 |
| 7,219,092 B2 | 5/2007 | Ikegaya et al. | 707/3 |
| 7,392,362 B2 * | 6/2008 | Yamauchi et al. | 711/170 |
| 7,406,491 B1 | 7/2008 | Iwano | 707/205 |
| 2001/0037371 A1 | 11/2001 | Ohran | 709/214 |
| 2001/0044878 A1 | 11/2001 | Ando et al. | 711/112 |
| 2001/0044910 A1 | 11/2001 | Ricart et al. | 714/6 |
| 2002/0007469 A1 | 1/2002 | Taketa et al. | 714/6 |
| 2002/0046322 A1 | 4/2002 | Butterworth et al. | 711/114 |
| 2002/0053009 A1 | 5/2002 | Selkirk et al. | 711/162 |
| 2002/0059245 A1 | 5/2002 | Zakharov et al. | 707/10 |
| 2002/0091898 A1 | 7/2002 | Matsunami et al. | 711/114 |
| 2002/0138559 A1 | 9/2002 | Ulrich et al. | 709/203 |
| 2002/0152416 A1 | 10/2002 | Fukuda | 714/7 |
| 2002/0156973 A1 | 10/2002 | Ulrich et al. | 711/114 |
| 2002/0156974 A1 | 10/2002 | Ulrich et al. | 711/114 |
| 2002/0162034 A1 | 10/2002 | Dimitri et al. | 713/300 |
| 2002/0174296 A1 | 11/2002 | Ulrich et al. | 711/114 |
| 2003/0014586 A1 | 1/2003 | Mitsuda et al. | 711/112 |
| 2003/0023811 A1 | 1/2003 | Kim | 711/114 |
| 2003/0070043 A1 | 4/2003 | Merkey | 711/114 |
| 2003/0115412 A1 | 6/2003 | Franklin | 711/114 |
| 2003/0135514 A1 | 7/2003 | Patel et al. | 707/102 |
| 2004/0078641 A1 | 4/2004 | Fleischmann | 714/6 |
| 2004/0173544 A1 | 9/2004 | Chen | 211/26 |
| 2005/0076178 A1 * | 4/2005 | Coppock et al. | 711/114 |
| 2005/0108475 A1 | 5/2005 | Yamamoto | 71/114 |
| 2005/0188257 A1 | 8/2005 | Morita | 714/13 |
| 2005/0283653 A1 | 12/2005 | Noguchi et al. | 714/6 |
| 2006/0129875 A1 | 6/2006 | Barrall | 714/6 |
| 2006/0143380 A1 | 6/2006 | Barrall et al. | 711/14 |
| 2007/0226331 A1 | 9/2007 | Srinivasan et al. | 709/223 |
| 2009/0016009 A1 | 1/2009 | Barrall et al. | 361/684 |

FOREIGN PATENT DOCUMENTS

| | | |
|---|---|---|
| EP | 0 446 940 | 9/1991 |
| EP | 0726521 A | 8/1996 |
| EP | 0 398 695 | 9/1998 |
| EP | 1 020 860 A2 | 7/2000 |
| EP | 1 081 596 | 3/2001 |
| EP | 1 400 967 A | 3/2004 |
| EP | 1 564 634 A2 | 8/2005 |
| EP | 1647982 | 4/2006 |
| GB | 2411746 | 7/2005 |
| JP | 4-095121 | 3/1992 |
| JP | 6-230903 | 8/1994 |
| JP | 7-110743 | 4/1995 |
| JP | 7-130139 | 5/1995 |
| JP | 8-063298 | 3/1996 |
| JP | 8-083152 | 3/1996 |
| JP | 8-190461 | 7/1996 |
| JP | 8-221876 | 8/1996 |
| JP | 8-249132 | 9/1996 |
| JP | 8-249624 | 9/1996 |
| JP | 9-062460 | 3/1997 |
| JP | 9-219003 | 8/1997 |
| JP | 9-269871 | 10/1997 |
| JP | 9-288547 | 11/1997 |
| JP | 10-011906 | 1/1998 |
| JP | 10260788 A | 9/1998 |
| JP | 11-039102 | 2/1999 |
| JP | 11-086452 | 3/1999 |
| JP | 2000-020248 | 1/2000 |
| JP | 2000-020249 | 1/2000 |

| | | |
|---|---|---|
| JP | 2001-035080 | 2/2001 |
| JP | 2001-206098 | 7/2001 |
| JP | 2002-100128 | 4/2002 |
| JP | 2002-175157 | 6/2002 |
| JP | 2002-288014 | 10/2002 |
| JP | 2003-150323 | 5/2003 |
| JP | 2003-223285 | 8/2003 |
| JP | 2003-271318 | 9/2003 |
| JP | 2003-316525 | 11/2003 |
| JP | 2004-103053 | 4/2004 |
| JP | 2004-118946 | 4/2004 |
| JP | 2004-213064 | 7/2004 |
| JP | 2005-149374 | 6/2005 |
| WO | WO 88/05593 | 7/1988 |
| WO | WO 92/09035 | 5/1992 |
| WO | WO 92/22865 | 12/1992 |
| WO | WO 93/04506 | 3/1993 |
| WO | WO 93/10496 | 5/1993 |
| WO | WO 2004/075175 | 9/2004 |
| WO | WO 2006/050455 A2 | 5/2006 |

OTHER PUBLICATIONS

"Virtual Hot Spare Disk Units," IBM Technical Disclosure Bulletin, IBM Corp., New York, vol. 37, No. 9, pp. 5-8, Sep. 1, 1994.
Authorized Officer Marja Brouwers Invitation to Pay Additional Fees with Partial International Search Report, PCT/US2005/040291, 5 pages, Jun. 7, 2006.
Authorized Officer Y. Sabbah International Search Report and Written Opinion of the International Searching Authority, PCT/US2005/040174, 10 pages, Jul. 14, 2006.
Authorized Officer Y. Sabbah International Search Report and Written Opinion of the International Searching Authority, PCT/US2005/039795, 9 pages, Jun. 30, 2006.
Patent Abstracts of Japan, vol. 1998, No. 14, Dec. 31, 1998, and JP 10 260788 A, 1 page Sep. 29, 1998.
Authorized Officer Y. Sabbah International Search Report and Written Opinion of the International Searching Authority, PCT/US2005/040175, Jul. 19, 2006, 9 pages.
Authorized Author Y. Sabbah International Search Report and Written Opinion of the International Searching Authority, PCT/US2005/040291, Sep. 12, 2006, 19 pages.
Yaniv Sabbah *Communication pursuant to Article 94(3) EPC*, Application No. 05 822 403.1-1225, Dec. 12, 2007.
Jonathan D. M. Atkinson Response to *Communication pursuant to Article 94(3) EPC*, Application No. 05 822 403.1-1225, Dec. 12, 2007 filed Jun. 16, 2008.
Authorized Officer Athina Nickitas-Etienne *International Preliminary Report on Patentability and Written Opinion of the International Searching Authority*, International Application No. PCT/US2005/0040291, May 8, 2007, 15 pages.
Authorized Officer Ellen Moyse *International Preliminary Report on Patentability and Written Opinion of the International Searching Authority*, International Application No. PCT/US2005/040174, May 8, 2007, 7 pages.
Authorized Officer Beata Pinková*Corrected International Search Report and Written Opinion of the International Searching Authority*, PCT/US2005/039795, Oct. 6, 2006, 13 pages.
Authorized Officer Yaniv Sabbah Communication Pursuant to Article 96(2) EPC, examination report from corresponding Eurpoean patent application No. 05824178.7 dated Nov. 15, 2007, 3 pages.
Authorized Officer Jonathan D.M. Atkinson Response dated May 20, 2008 to Nov. 15, 2007 European examination report from corresponding Eurpoean patent application No. 05824178.7.
Authorized Officer Philippe Becamel *International Preliminary Report on Patentability*, International Application No. PCT/US2005/039795, May 8, 2007, 7 pages.
Patterson et al. *A Case for Redundant Arrays of Inexpensive Disks (RAID)*, Computer Science Division, Department of Electrical Engineering and Computer Sciences, University of California, 1988, 8 pages.
Chandy et al. *Failure Evaluation of Disk Array Organizations*, University of Illinois, IBM Almaden Research Center, 8 pages, 1993.

Holland *Online Data Reconstruction in Redundant Disk Arrays*, School of Computer Science, Carnegie Mellon University, May 1994, 254 pages.
Golubchik et al. *Fault Tolerance Issues in Data Declustering for Parallel Database Systems*, Bulletin of the Technical Committee on Data Engineering, Sep. 1994, 18 pages.
Bestavros *IDA-based Redundant Arrays of Inexpensive Disks*, Department of Computer Science, Boston University, Dec. 1991, 8 pages.
Mogi et al. *Hot Block Clustering for Disk Arrays with Dynamic Striping*, Institute of Industrial Science, The University of Tokyo, Sep. 1995, 10 pages.
Scheuermann et al. *Adaptive Load Balancing in Disk Arrays*, Department of Elec. Eng. And Computer Science, Northwestern University, 25 pages, 1993.
Scheuermann et al. *Data Partitioning and Load Balancing in Parallel Disk Systems*, Department of Elec. Eng. And Computer Science, Northwestern University, 45 pages, 1998.
Digital Equipment Corp. *DEC RAID Subsystem User's Guide*, May 1993, 100 pages.
Hong et al. *Duplicate Data Elimination in a SAN File System*, University of California, Santa Cruz, IBM Almaden Research Center, 14 pages, 2004.
Authorized Officer J. Andlauer *International Search Report and Written Opinion of the International Searching Authority*, International Searching Authority, International Application No. PCT/US2007/068139, Nov. 28, 2007, 10 pages.
Authorized Officer Athina Nickitas-Etienne *International Preliminary Report on Patentability*, International Application No. PCT/US2007/068139, Nov. 4, 2008, 6 pages.
Authorized Officer Roberto Sozzi *International Search Report and Written Opinion of the International Searching Authority*, International Searching Authority, International Application No. PCT/US2008/060099, Jul. 4, 2008, 11 pages.
Authorized Officer Selwa Harris *International Search Report and Written Opinion of the International Searching Authority*, PCT/US2005/040291, Sep. 12, 2006, 19 pages.
Authorized Officer Athina Nickitas-Etienne *International Preliminary Report on Patentability*, International Application No. PCT/US2005/040291, Issued May 8, 2007, 15 pages.
Authorized Officer Sabbah, Y. *International Search Report*; International Application No. PCT/US2005/040174, Issued Jul. 14, 2006, 4 pages.
Authorized Officer Sabbah, Y. *Written Opinion of the International Searching Authority*, International Application No. PCT/US2005/040174, Issued Jul. 14, 2006, 6 pages.
Authorized Officer Selwa Harris *International Search Report and Written Opinion of the International Searching Authority*, International Application No. PCT/US2005/039795, Issued Jun. 30, 2006, 11 pages.
Authorized Officer Philippe Becamel *International Preliminary Report on Patentability and The Written Opinion Of The International Searching Authority*, Or the Declaration; PCT/US2005/039795, Issued May 8, 2007, 7 pages.
Authorized Officer Beata Pinková*International Search Report And The Written Opinion Of The International Searching Authority, Or The Declaration*; PCT/US2005/039795, Issued Oct. 16, 2006, 13 pages.
Authorized Officer Ellen Moyse *International Preliminary Report on Patentability, and Written Opinion* of the International Application No. PCT/US2005/040175, Issued May 8, 2007, 6 pages.
Authorized Officer Selwa Harris *International Search Report and Written Opinion of the International Searching Authority, or the Declaration*, PCT/US2005/040175, Issued Jul. 19, 2006, 11 pages.
Authorized Officer Roberto Sozzi *International Search Report*, PCT/US2008/060099, Issued Jul. 4, 2008, 3 pages.
"*HP Announces First HP AutoRAID Product: New Disk Array Scheduled for OEM Distribution in Fall with Evaluation Units Now Shipping*," Business Wire, Jul. 17, 1995, 2 pages.
"*What is AutoRAID?*," http://docs.hp.co/en/B2355, printed Aug. 1, 2006, 2 pages.

Yaniv Sabbah "*International Search Report and Written Opinion of the International Searching Authority*," PCT /US2005/040291, Nov. 3, 2006, 24 pages.
Japanese Patent Office, Notice of Reasons for Rejection; Japanese Patent Office; Japanese Patent Application No. 2007-540108; Mar. 18, 2010, 4 pages.
Japanese Patent Office, English Translation: Notice of Reasons for Rejection; Japanese Patent Office; Japanese Patent Application No. 2007-540108; Mar. 18, 2010, 5 pages.
Quinlan, et al., *Venti: A New Approach to Archival Storage*. Jan. 2002. Conference on File and Storage Technologies, USENIX Association.
Wilkes, et al., "*The HP AutoRAID Hierarchical Storage System,*" ACM Transactions on Computer Systems, United States, ACM, Feb. 1996, vol. 14, No. 1, pp. 96-108.
Japanese Patent Office, *International Search Report*, PCT/JP03/01798, Issued May 27, 2003, 3 pages.
Gray, et al., *The Recovery Manager of the System R. Database Manager*, ACM Comput. Surv. 13, 2 (Jun. 1981), 223-242.
Giampaolo, D., *Practical File System Design: The Be File System*. 1999 Morgan Kaufmann.
Japanese Patent Office, *English translation of Notice of Reasons for Rejection*, JP 2007-540027, Mar. 16, 2010, 10 pgs.
Japanese Patent Office, *English translation of Notice of Reasons for Rejection*, JP 2007-540109, Mar. 18, 2010, 8 pgs.
Japanese Patent Office, *English translation of Notice of Reasons for Rejection*, JP 2007-540136, Mar. 19, 2010, 7 pgs.
Abstract of JP 4-095121, 2 pgs.
Abstract of JP 6-230903, 2 pgs.
Abstract of JP 7-110743, 2 pgs.
Abstract of JP 7-130139, 2 pgs.
Abstract of JP 8-063298, 1 pg.
Abstract of JP 8-083152, 2 pgs.
Abstract of JP 8-190461, 2 pgs.
Abstract of JP 8-221876, 2 pgs.
Abstract of JP 8-249132, 2 pgs.
Abstract of JP 8-249624, 2 pgs.
Abstract of JP 9-062460, 1 pg.
Abstract of JP 9-219003, 2 pgs.
Abstract of JP 9-269871, 2 pgs.
Abstract of JP 9-288547, 2 pgs.
Abstract of JP 10-011906, 2 pgs.
Abstract of JP 11-039102, 2 pgs.
Abstract of JP 11-086452, 2 pgs.
Abstract of JP 2000-020248, 2 pgs.
Abstract of JP 2000-020249, 2 pgs.
Abstract of JP 2001-035080, 2 pgs.
Abstract of JP 2001-206098, 2 pgs.
Abstract of JP 2002-100128, 2 pgs.
Abstract of JP 2002-288014, 2 pgs.
Abstract of JP 2003-150323, 2 pgs.
Abstract of JP 2003-223285, 2 pgs.
Abstract of JP 2003-271318, 2 pgs.
Abstract of JP 2003-316525, 2 pgs.
Abstract of JP 2004-103053, 2 pgs.
Abstract of JP 2004-118946, 1 pg.
Abstract of JP 2004-213064, 1 pg.
Abstract of JP 2005-214374, 1 pg.
Abstract of WO 2004/075175, 2 pgs.

* cited by examiner

CHUNKS #1, #2, #3    STORED USING PATTERN 3 (STRIPING USING 3 DEVICES)

CHUNKS #10, #11, #12  STORED USING PATTERN 2 (MIRRORED USING 2 DEVICES)

CHUNKS #20, #21   STORED USING PATTERN 1 (MIRRORED USING 1 DEVICE)

a) All Drives OK with Array space available.

b) Slot C & Slot D full - data not redundant: Add drive to empty Slot A c) Array cannot maintain redundant data in the event of a power failure: Replace drive in Slot D d) Drive in Slot C has failed

STORAGE SYSTEM CONDITION INDICATOR AND METHOD

PRIORITY

This application claims priority from the following United States Provisional Patent Applications, which are hereby incorporated herein by reference in their entireties:
60/625,495 filed on Nov. 5, 2004; and
60/718,768 filed on Sep. 20, 2005.

TECHNICAL FIELD AND BACKGROUND ART

The present invention relates to digital data storage systems and methods, and more particularly to those providing fault-tolerant storage.

It is known in the prior art to provide redundant disk storage in a pattern according to any one of various RAID (Redundant Array of Independent Disks) protocols. Typically disk arrays using a RAID pattern are complex structures that require management by experienced information technologists. Moreover in many array designs using a RAID pattern, if the disk drives in the array are of non-uniform capacities, the design may be unable to use any capacity on the drive that exceeds the capacity of the smallest drive in the array.

One problem with a standard RAID system is that it is possible for disc-surface corruption to occur on an infrequently used area of the disk array. In the event that another drive fails, it is not always possible to determine that corruption has occurred. In such a case, the corrupted data may be propagated and preserved when the RAID array rebuilds the failed drive.

In many storage systems, a spare storage device will be maintained in a ready state so that it can be used in the event another storage device fails. Such a spare storage device is often referred to as a "hot spare." The hot spare is not used to store data during normal operation of the storage system. When an active storage device fails, the failed storage device is logically replaced by the hot spare, and data is moved or otherwise recreated onto the hot spare. When the failed storage device is repaired or replaced, the data is typically moved or otherwise recreated onto the (re-)activated storage device, and the hot spare is brought offline so that it is ready to be used in the event of another failure. Maintenance of a hot spare disk is generally complex, and so is generally handled by a skilled administrator. A hot spare disk also represents an added expense.

SUMMARY OF THE INVENTION

In first embodiments of the invention there is provided a method and storage system condition indicator method that involves determining if the system is operative and has redundancy for newly stored objects across all storage devices, and if so, indicating "go" status wherein storage provides good level of data safety; determining if the system is operative and has redundancy for newly stored objects across some but not all storage devices, and if so, indicating "more storage needed for efficiency" status wherein more storage is needed for efficient storage of data consistent with safety; and determining if the system is operative and has redundancy for newly stored objects on only a single storage device, and if so, indicating "more storage needed for safety" status wherein more storage is needed for data safety.

In related embodiments, the indicating may be accomplished using a single indicator, such as a multiple color light where each color is associated with a different condition or may be accomplished using a plurality of indicators where each indicator is associated with a different condition.

In other related embodiments, a determination may be made as to whether the system is in a transition from one status to another status, and if so, the fact of the transition may be indicated. The fact of the transition can be indicated, for example, by flashing the light between an off state and an on state or by flashing the light between two different colors.

In second embodiments of the invention there is provided a method and storage system for indicating status of an array of storage devices. Storage system status is determined based on the amount of available storage and the level of redundancy in the array of storage devices. A further determination is made as to whether additional storage capacity is recommended based on the amount of available storage and the level of redundancy in the array of storage devices. The storage system status is indicated including, if additional storage capacity is recommended, an indication as to which slot in the array should be populated with additional storage capacity.

In related embodiments, each slot in the array may be associated with an indicator, in which case the indicators may be used collectively to indicate said storage system status including indicating which slot in the array should be populated with additional storage capacity. System status may be indicated by setting the indicator associated with a given slot to a first state if said slot should not be populated with additional storage capacity; setting the indicator associated with said slot to a second state, if the system has redundancy for newly stored objects across some but not all storage devices and said slot should be populated with additional storage capacity; and setting the indicator associated with said slot to a third state, if the system has redundancy for newly stored objects on only a single storage device and said slot should be populated with additional storage capacity. Each indicator may be a multiple color light, and each state may be associated with a different color. The first state may be associated with a green light, the second state may be associated with a yellow or amber light, and the third state may be associated with a red light.

In other related embodiments, a determination may be made as to whether the system is in a transition from one status to another status, and if so, the fact of the transition may be indicated. The fact of the transition can be indicated, for example, by flashing the light between an off state and an on state or by flashing the light between two different colors.

In other related embodiments, the indicators may comprise a front panel for each of the slots and associated lights for illuminating the front panels to indicate said storage system status including which slot in the array should be populated with additional storage capacity.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "chunk" of an object is an abstract slice of an object, made independently of any physical storage being used, and is typically a fixed number of contiguous bytes of the object.

A fault-tolerant "pattern" for data storage is the particular which by data is distributed redundantly over one or more storage devices, and may be, among other things, mirroring (e.g., in a manner analogous to RAID1), striping (e.g., in a manner analogous to RAID5), RAID6, dual parity, diagonal Parity, Low Density Parity Check codes, turbo codes, or other redundancy scheme or combination of redundancy schemes.

A hash number for a given chunk is "unique" when the given chunk produces a hash number that generally will differ from the hash number for any other chunk, except when the other chunk has data content identical to the given chunk. That is, two chunks will generally have different hash numbers whenever their content is non-identical. As described in further detail below, the term "unique" is used in this context to cover a hash number that is generated from a hash function occasionally producing a common hash number for chunks that are non-identical because hash functions are not generally perfect at producing different numbers for different chunks.

A "Region" is a set of contiguous physical blocks on a storage medium (e.g., hard drive).

A "Zone" is composed of two or more Regions. The Regions that make up a Zone are generally not required to be contiguous. In an exemplary embodiment as described below, a Zone stores the equivalent of 1 GB of data or control information.

A "Cluster" is the unit size within Zones and represents a unit of compression (discussed below). In an exemplary embodiment as described below, a Cluster is 4 KB (i.e., eight 512-byte sectors) and essentially equates to a Chunk.

A "Redundant set" is a set of sectors/clusters that provides redundancy for a set of data.

"Backing up a Region" involves copying the contents of one Region to another Region.

A "first pair" and a "second pair" of storage devices may include a common storage device.

A "first plurality" and a "second plurality" of storage devices may include one or more common storage devices.

A "first arrangement" and a "second arrangement" or "different arrangement" of storage devices may include one or more common storage devices.

Figure 1:
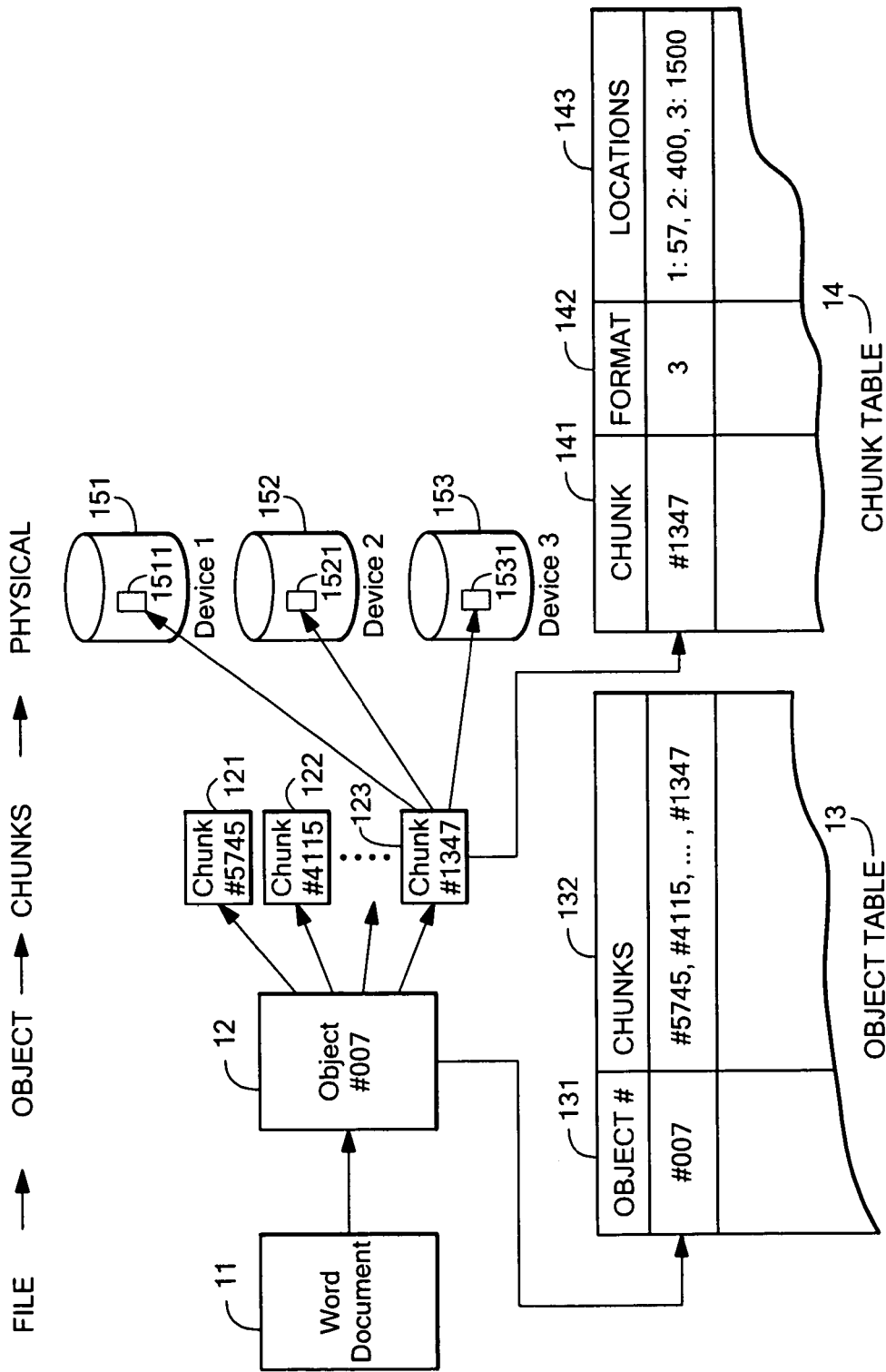
FIG. 1 is an illustration of an embodiment of the invention in which an object is parsed into a series of chunks for storage.

FIG. 1 is an illustration of an embodiment of the invention in which an object, in this example, a file, is parsed into a series of chunks for storage. Initially the file 11 is passed into the storage software where it is designated as an object 12 and allocated a unique object identification number, in this case, #007. A new entry 131 is made into the object table 13 to represent the allocation for this new object. The object is now parsed into "chunks" of data 121, 122, and 123, which are fixed-length segments of the object. Each chunk is passed through a hashing algorithm, which returns a unique hash number for the chunk. This algorithm can later be applied to a retrieved chunk and the result compared with the original hash to ensure the retried chunk is the same as that stored. The hash numbers for each chunk are stored in the object table 13 in the entry row for the object 132 so that later the complete object can be retrieved by collection of the chunks.

Also in FIG. 1, the chunk hashes are now compared with existing entries in the chunk table 14. Any hash that matches an existing entry 141 is already stored and so no action is taken (i.e., the data is not stored again, leading to automatic compression of the objects). A new hash (one which has no corresponding entry in the chunk table 14) is entered into the chunk table 141. The data in the chunk is then stored on the available storage devices 151, 152, and 153 in the most efficient manner for fault-tolerant storage. This approach may lead to the chunk data's being stored, for example, in a mirrored fashion on a storage system comprised of one or two devices or parity striped on a system with more than two storage devices. This data will be stored on the storage devices at physical locations 1511, 1521, and 1531, and these locations and the number of locations will be stored in the chunk table columns 143 and 142 so that all physical parts of a chunk may later be located and retrieved.

Figure 2A:
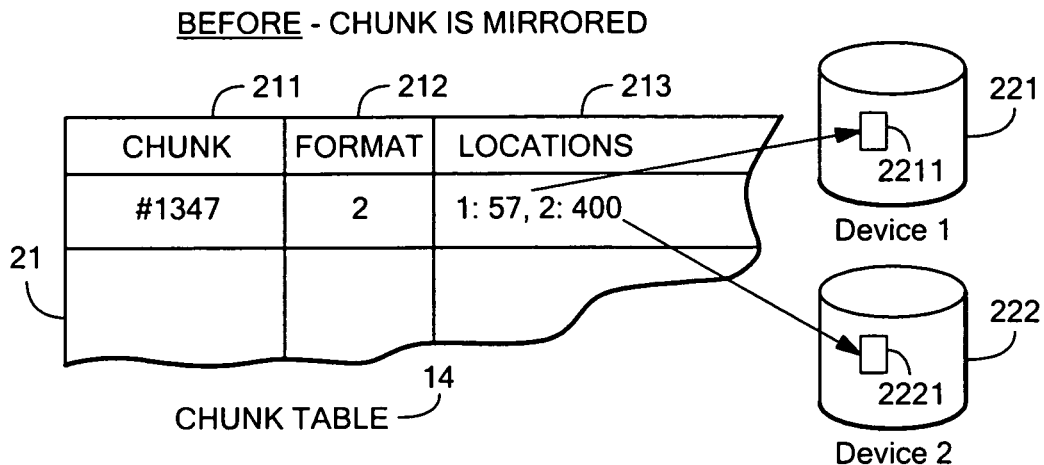
FIG. 2 illustrates in the same embodiment how a pattern for fault-tolerant storage for a chunk may be dynamically changed as a result of the addition of more storage.
Figure 2B:
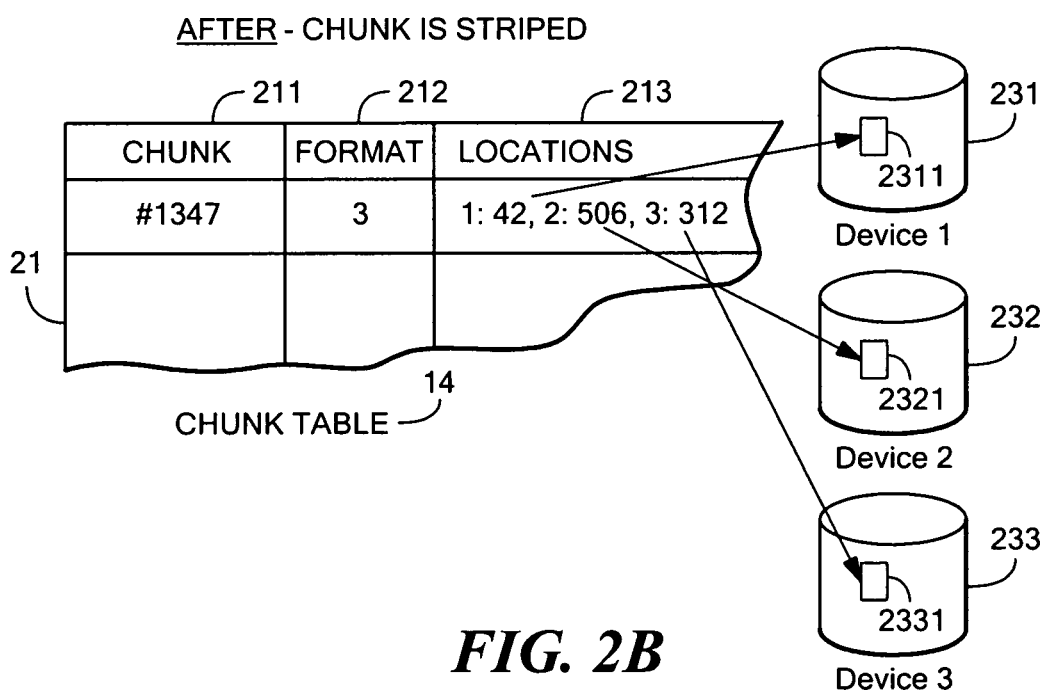

FIG. 2 illustrates in the same embodiment how a pattern for fault-tolerant storage for a chunk may be dynamically changed as a result of the addition of more storage. In particular, FIG. 2 shows how a chunk physically stored on the storage devices may be laid out in a new pattern once additional storage is added to the overall system. In FIG. 2(*a*), the storage system comprises two storage devices 221 and 222 and the chunk data is physically mirrored onto the two storage devices at locations 2211 and 2221 to provide fault tolerance. In FIG. 2(*b*) a third storage device 223 is added, and it become possible to store the chunk in a parity striped manner, a pattern which is more storage efficient than the mirrored pattern. The chunk is laid out in this new pattern in three physical locations 2311, 2321, and 2331, taking a much lower proportion of the available storage. The chunk table 21 is updated to show the new layout is in three locations 212 and also the new chunk physical locations 2311, 2321, and 2331 are recorded 213.

Figure 3:
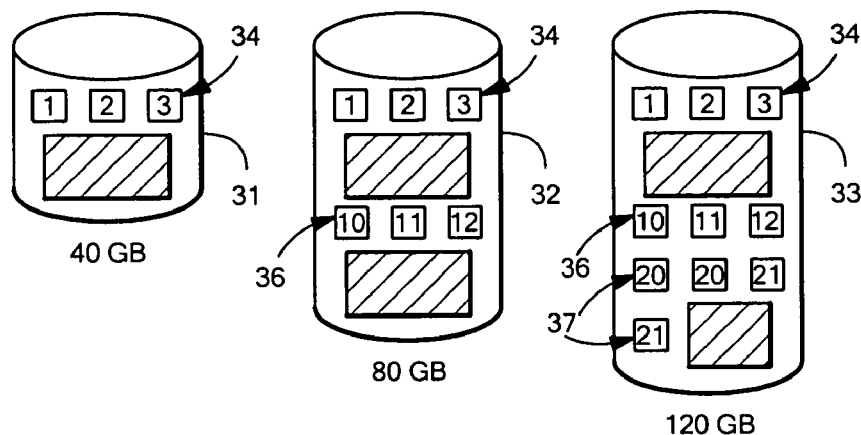
FIG. 3 illustrates in a further embodiment of the invention the storage of chunks in differing fault-tolerant patterns on a storage system constructed using different sized storage devices.

FIG. 3 shows a mature storage system, in accordance with an embodiment of the present invention, which has been functioning for some time. This illustrates how chunks may be physically stored over time on storage devices with varying storage capacities. The figure shows a storage system comprised of a 40 GB storage device 31, an 80 GB storage device 32 and a 120 GB storage device 33. Initially chunks are stored in a fault tolerant stripe pattern 34 until the 40 GB storage device 31 became full. Then, due to lack of storage space, new data is stored in a mirrored pattern 36 on the available space on the 80 GB 32 and the 120 GB 33 storage devices. Once the 80 GB storage device 32 is full, then new data is laid out in a single disk fault tolerant pattern 37. Even though the storage devices comprise a single pool for storing data, the data itself, as stored in the chunks, has been stored in a variety of distinct patterns.

Figure 4A:
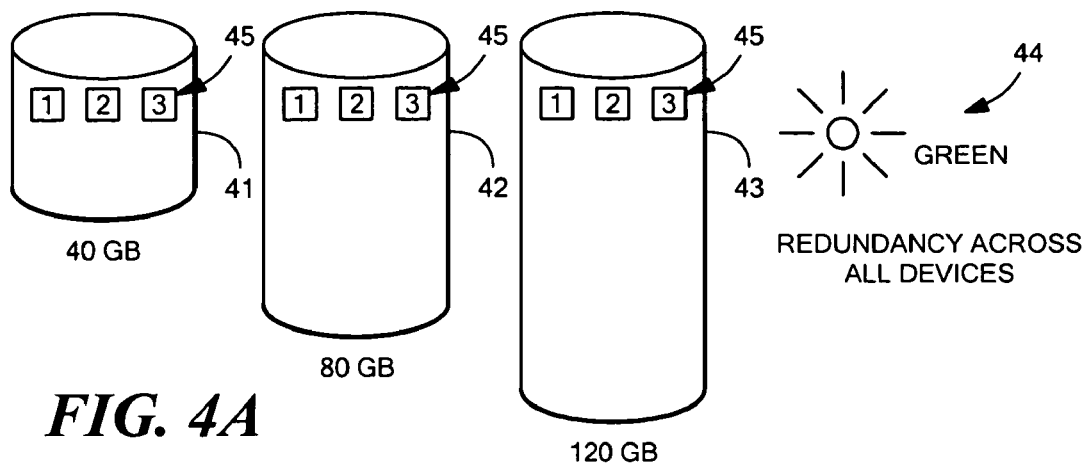
FIG. 4 illustrates another embodiment of the invention in which indicator states are used to warn of inefficient storage use and low levels of fault tolerance.
Figure 4B:
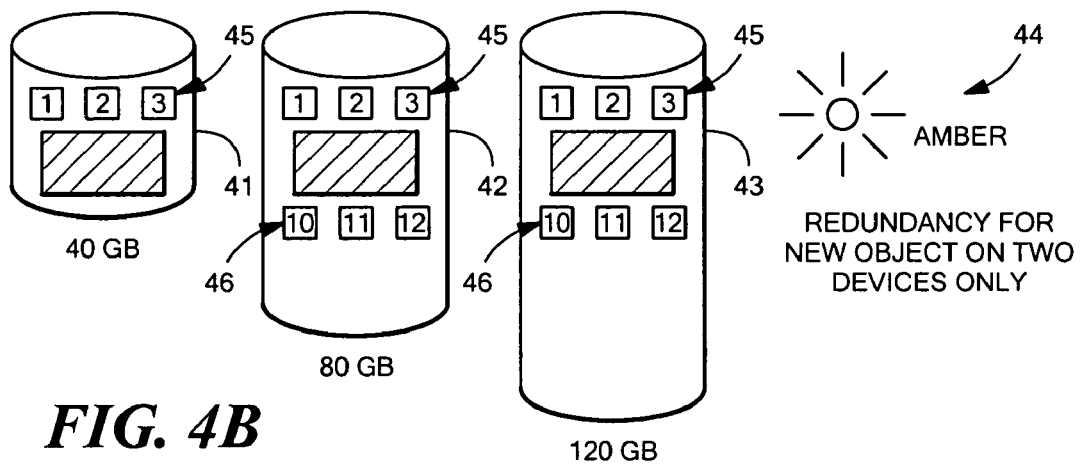
Figure 4C:
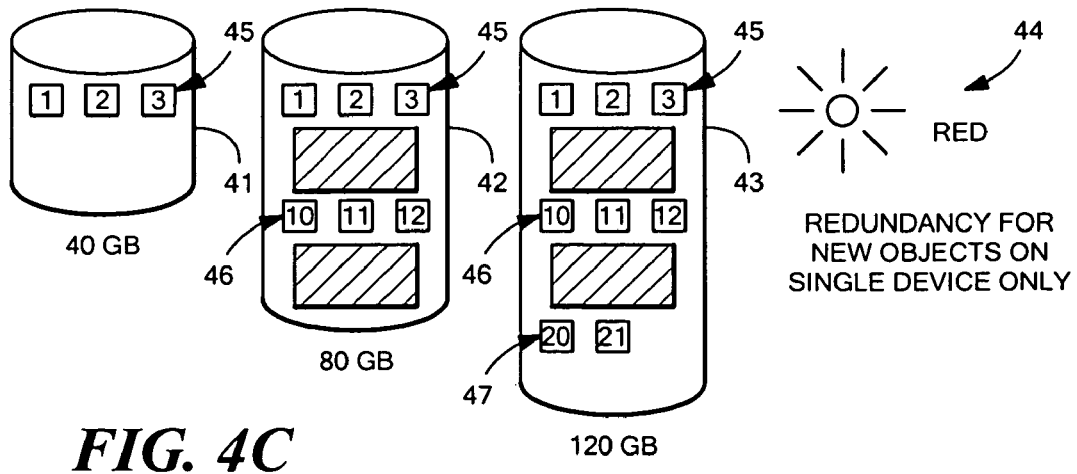

FIG. 4 illustrates another embodiment of the invention in which indicator states are used to warn of inefficient storage use and low levels of fault tolerance. In FIG. 4(*a*), all three storage devices 41, 42, and 45 have free space and the indicator light 44 is green to show data is being stored in an efficient and fault-tolerant manner. In FIG. 4(*b*) the 40 GB storage device 41 has become full, and thus new data can be stored only on the two storage devices 42 and 43 with remaining free space in a mirrored pattern 46. In order to show the data is still fully redundant but not efficiently stored, the indicator light 44 has turned amber. In FIG. 4(*c*), only the 120 GB storage device 43 has free space remaining and so all new data can be stored only in a mirrored pattern on this one device 43. Because the fault-tolerance is less robust and the system is critically short of space, the indicator light 44 turns red to indicate the addition of more storage is necessary.

In one alternative embodiment, an indicator is provided for each drive/slot in the array, for example, in the form of a three-color light (e.g., green, yellow, red). In one particular embodiment, the lights are used to light the whole front of a disk carrier with a glowing effect. The lights are controlled to indicate not only the overall status of the system, but also which drive/slot requires attention (if any). Each three-color light can be placed in at least four states, specifically off, green, yellow, red. The light for a particular slot may be placed in the off state if the slot is empty and the system is operating with sufficient storage and redundancy so that no drive need be installed in the slot. The light for a particular slot may be placed in the green state if the corresponding drive is sufficient and need not be replaced. The light for a particular slot may be placed in the yellow state if system operation is degraded such that replacement of the corresponding drive with a larger drive is recommended. The light for a particular slot may be placed in the red state if the corresponding drive must be installed or replaced. Additional states could be indicated as needed or desired, for example, by flashing the light between on and off states or flashing the light between two different colors (e.g., flash between red and green after a drive has been replaced and re-layout of data is in progress). Additional details of an exemplary embodiment are described below.

Of course, other indication techniques can be used to indicate both system status and drive/slot status. For example, a single LCD display could be used to indicate system status and, if needed, a slot number that requires attention. Also, other types of indicators (e.g., a single status indicator for the system (e.g., green/yellow/red) along with either a slot indicator or a light for each slot) could be used.

Figure 5:
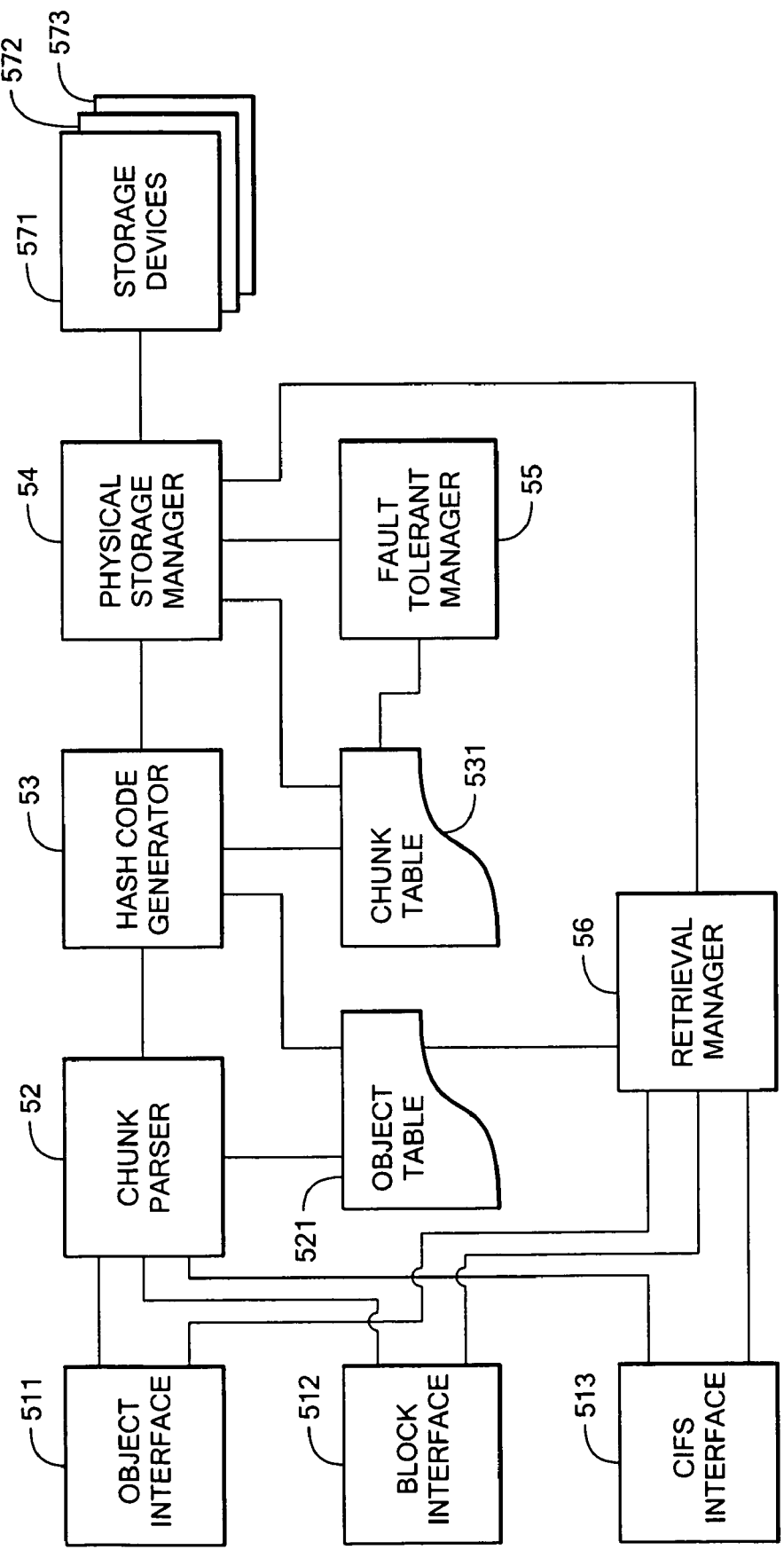
FIG. 5 is a block diagram of functional modules used in the storage, retrieval and re-layout of data in accordance with an embodiment of the invention.

FIG. 5 is a block diagram of functional modules used in the storage, retrieval and re-layout of data in accordance with an embodiment of the invention, such as discussed above in connections with FIGS. 1-3. The entry and exit point for communication are the object interface 511 for passing objects to the system for storage or retrieving objects, the block interface 512, which makes the storage system appear to be one large storage device, and the CIFS interface 513, which makes the storage system appear to be a Windows file system. When these interfaces require the storage of data, the data is passed to the Chunk Parser 52, which performs the break up of the data into chunks and creates an initial entry into the object table 512 (as discussed above in connection with FIG. 1). These chunks are then passed to the hash code generator 53, which creates the associated hash codes for each chunk and enters these into the object table so the chunks associated with each object are listed 512 (as discussed above in connection with in FIG. 1). The chunk hash numbers are compared with the entries in the chunk table 531. Where a match is found, the new chunk is discarded, as it will be identical to a chunk already stored in the storage system. If the chunk is new, a new entry for it is made in the chunk table 531, and the hashed chunk is passed to the physical storage manager 54. The physical storage manager stores the chunk in the most efficient pattern possible on the available storage devices 571, 572, and 573 and makes a corresponding entry in the chunk table 531 to show where the physical storage of the chunk has occurred so that the contents of the chunk can be retrieved later 512 (as discussed above in connection with FIG. 1).

The retrieval of data in FIG. 5 by the object 511, block 512 or CIFS 513 interface is performed by a request to the retrieval manager 56, which consults the object table 521 to determine which chunks comprise the object and then requests these chunks from the physical storage manager 54. The physical storage manager 54 consults the chunk table 531 to determine where the requested chunks are stored and then retrieves them and passes the completed data (object) back to the retrieval manager 56, which returns the data to the requesting interface. Also included in FIG. 5 is the fault tolerant manager (FTL) 55, which constantly scans the chunk table to determine if chunks are stored in the most efficient manner possible. (This may change as storage devices 571, 572, and 573 are added and removed.) If a chunk is not stored in the most efficient manner possible, then the FTL will request the physical storage manager 54 to create a new layout pattern for the chunk and update the chunk table 531. This way all data continues to remain stored in the most efficient manner possible for the number of storage devices comprising the array (as discussed above in connection with FIGS. 2 and 3).

The following provides additional details of an exemplary embodiment of the present invention.

Data Layout Scheme—Zones

Among other things, a Zone has the effect of hiding redundancy and disk re-layout from the actual data being stored on the disk. Zones allow additional layout methods to be added and changed without affecting the user of the zone.

The storage array lays out data on the disk in virtual sections called Zones. A Zone stores a given and fixed amount of data (for example 1 G Bytes). A zone may reside on a single disk or span across one or more drives. The physical layout of a Zone provides redundancy in the form specified for that zone.

Figure 6:
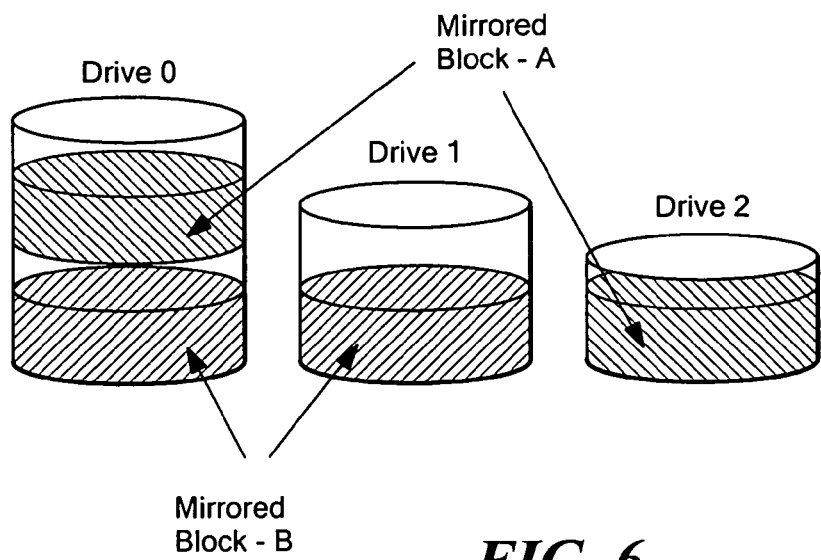
FIG. 6 shows an example in which mirroring is used in an array containing more than two drives.
Figure 7:
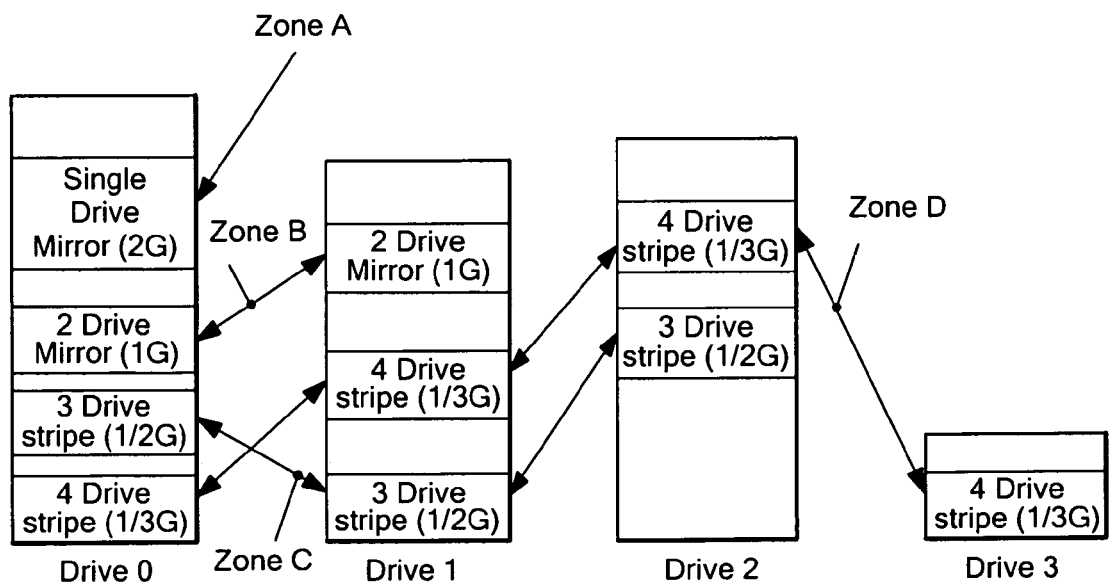
FIG. 7 shows some exemplary zones using different layout schemes to store their data.

FIG. 6 shows an example in which mirroring is used in an array containing more than two drives. FIG. 7 shows some example zones using different layout schemes to store their data. The diagram assumes a zone stores 1 GB of data. Note the following points:

i) A zone that spans multiple drives does not necessarily use the same offset into the drive across the set.

ii) A single drive mirror requires 2 G of storage to store 1 G of data iii) A dual drive mirror requires 2 G of storage to store 1 G of data.

iv) A 3 drive stripe requires 1.5 G of storage to store 1 G of data.

v) A 4 drive stripe requires 1.33 G of storage to store 1 G of data.

vi) Zone A, zone B etc. are arbitrary zone names. In a real implementation each zone would be identified by a unique number.

vii) Although implied by the diagram, zones are not necessarily contiguous on a disk (see regions later).

viii) There is no technical reason why mirroring is restricted to 2 drives. For example, in a 3 drive system 1 copy of the data could be stored on 1 drive and half of the mirrored data could be stored on each of the other two drives. Likewise, data could be mirrored across three drives, with half the data on each of two drives and half of the mirror on the other two drives.

Data Layout Scheme—Regions

Each disk is split into a set of equal-sized Regions. The size of a Region is much smaller than a Zone and a Zone is constructed from one or more regions from one or more disks. For efficient use of disk space, the size of a Region is typically a common factor of the different Zone sizes and the different number of disks supported by the array. In an exemplary embodiment, Regions are $\frac{1}{12}$ the data size of a Zone. The following table lists the number of Regions/Zone and the number of Regions/disk for various layouts, in accordance with an exemplary embodiment of the invention.

| Layout Method | Number of regions/zone | Number of regions/disk |
| --- | --- | --- |
| 1 drive mirror | 24 | 24 |
| 2 drive mirror | 24 | 12 |
| 3 drive stripe | 18 | 6 |
| 4 drive stripe | 16 | 4 |

Individual Regions can be marked as used, free or bad. When a Zone is created, a set of free Regions from the appropriate disks are selected and logged in a table. These Regions can be in any arbitrary order and need not be contiguous on the disk. When data is written to or read from a Zone, the access is redirected to the appropriate Region. Among other things, this allows data re-layout to occur in a flexible and efficient manner. Over time, the different sized Zones will likely cause fragmentation to occur, leaving many disk areas too small to hold a complete Zone. By using the appropriate Region size, all gaps left by fragmentation will be at least one Region in size, allowing easy reuse of these small gaps with out having to de-fragment the whole disk.

Data Layout Scheme—Re-Layout

In order to facilitate implementation, a fixed sequence of expansion and contraction may be enforced. For example, if two drives are suddenly added, the expansion of a zone may go through an intermediate expansion as though one drive was added before a second expansion is performed to incorporate the second drive. Alternatively, expansion and contraction involving multiple drives may be handled atomically, without an intermediate step.

Before any re-layout occurs, the required space must be available. This should be calculated before starting the re-layout to ensure that unnecessary re-layout does not occur.

Data Layout Scheme—Drive Expansion

The following describes the general process of expanding from single drive mirroring to dual drive mirroring in accordance with an exemplary embodiment of the invention:

i) Assuming single drive mirror has data 'A' and mirror 'B' ii) Allocate 12 regions on drive to expand zone on to 'C' iii) Copy mirror 'B' to region set 'C' iv) Any writes made to data already copied must be mirrored to the appropriate place in 'C' v) When copy is complete, update zone table with new layout type and replace pointers to 'B' with pointers to "C"

vi) Mark the regions that make-up 'B' as free.

The following describes the general process of expanding from dual drive mirroring to triple drive striping with parity in accordance with an exemplary embodiment of the invention:

i) Assume one drive has data 'A' and a second drive has mirror 'B' ii) Allocate 6 regions on third drive for parity information 'C' iii) Calculate parity information using first 6 regions of 'A' and the second 6 regions of 'B' iv) Place parity information in 'C' v) Any writes made to data already processed must be parity'd to the appropriate place in 'C' vi) When copy is complete, update zone table with new layout type point table to first half of 'A', second half of 'B' and 'C' vii) Mark second half of 'A' and first half of 'B' as free.

The following describes the general process of expanding from triple drive striping to quad drive striping with parity in accordance with an exemplary embodiment of the invention:

i) Assume one drive has data 'A', a second drive has data 'B' and a third has parity 'P' ii) Allocate four regions on a fourth drive for strip data 'C' iii) Copy last two regions of 'A' to the first two regions of 'C' iv) Copy first two regions of 'B' to last to regions of 'C' v) Allocate four regions on parity drive 'D' vi) Calculate parity information using first four regions of A, C and the last four regions of B vii) Place parity information in 'D' viii) Any writes made to data already processed must be parity'd to the appropriate place in 'D' ix) Update zone table with new layout type and point table to first four regions of 'A', 'C', second four regions of 'B' and 'D' x) Mark last two regions of 'A' and first two regions of 'B' as free.

Data Layout Scheme—Drive Contraction

Drive contraction takes place when a disk is either removed or fails. In such a case, the array contracts the data to get all zones back into a redundant state if possible. Drive contraction is slightly more complex than expansion as there are more choices to make. However, transitions between layout methods happen in a similar way to expansion, but in reverse. Keeping the amount of data to be reproduced to a minimum allows redundancy to be achieved as quickly as possible. Drive contraction generally precedes one zone at a time while space is available until all zones are re-layed out. Generally speaking, only data which resides on the removed or failed disk will be rebuilt.

Choosing How to Contract

The following table describes a decision tree for each zone that needs to be re-laid out, in accordance with an exemplary embodiment of the present invention:

| Zone type missing data | Condition | Action |
| --- | --- | --- |
| Any | No Space available for zone re-layout | Leave zone in degraded state until new disk added or removed disk is replaced. |
| Single drive mirror | Data inconsistent | Lock down system and wait for reset or for the missing drive to be replaced |
| Dual Drive Mirror | 1 disk left in system | Convert to single drive mirror |
| | Space only available on drive that contains remaining data | |
| | 2 or 3 disks left in system with space is available | Reconstruct mirror on another drive |
| 3 Drive Striping | 2 disks left in system with space available | Convert to 2 drive mirroring |
| | 3 disks left in system with space available | Reconstruct missing stripe segment on the third drive |
| 4 Drive Striping | 3 disks left in system with space available | Convert to 3 drive striping |

The following describes the general process of contracting from dual drive mirroring to single drive mirroring in accordance with an exemplary embodiment of the invention:

i) Assuming single drive mirror has data 'A' and missing mirror 'B' or visa versa ii) Allocate 12 regions on the drive that contains 'A' as 'C' iii) Copy data 'A' to region set 'C' iv) Any writes made to data already copied must be mirrored to the appropriate place in 'C' v) When copy is complete, update zone table with new layout type and replace pointers to 'B' with pointers to 'C'

The following describes the general process of contracting from triple drive stripe to dual drive mirror (missing parity) in accordance with an exemplary embodiment of the invention:

i) Assuming that stripe consists of data blocks 'A', 'B' and 'C' on different drives. Parity 'C' is missing.

ii) Define 'A' as containing the first half of the zone and 'B' as the second half of the zone.

iii) Allocate 6 regions 'D' on the 'A' drive and 6 regions 'E' on the 'B' drive iv) Copy 'A' to 'E'.

v) Copy 'B' to 'D' vi) Any writes made to data already copied must be mirrored to the appropriate place in 'D' and 'E' vii) When copy is complete, update zone table with new layout type and set pointers to 'A'/'D' and 'E'/'B'

The following describes the general process of contracting from triple drive stripe to dual drive mirror (missing data) in accordance with an exemplary embodiment of the invention:

i) Assuming that stripe consists of data blocks 'A', 'B' and 'C' on different drives. Data 'C' is missing.

ii) Define 'A' as containing the first half of the zone and 'C' as the second half of the zone.

iii) Allocate 6 regions 'D' on the 'A' drive and 12 regions 'E' on the 'B' drive
iv) Copy 'A' to the first half of 'E'
v) Reconstruct missing data from 'A' and 'B'. Write data to 'D'
vi) Copy 'D' to second half of 'E'.
vii) Any writes made to data already copied must be mirrored to the appropriate place in 'D' and 'E'
viii) When copy is complete, update zone table with new layout type and set pointers to 'A'/'D' and 'E'
ix) Mark 'B' regions as free.

The following describes the general process of contracting from quad drive stripe to triple drive stripe (missing parity) in accordance with an exemplary embodiment of the invention:

i) Assuming that stripe consists of data blocks 'A', 'B', 'C' and 'D' on different drives. Parity 'D' is missing.
ii) Define 'A' as containing the first third, 'B' as the second third and 'C' as the third third of the zone
iii) Allocate 2 regions 'G' on the 'A' drive, 2 regions 'E' on the 'C' drive and 6 regions 'F' on the 'B' drive.
iv) Copy first half of 'B' to 'G'
v) Copy second half of 'B' to 'E'
vi) Construct parity from 'A'/'G' and 'E'/'C' and write to 'F'
vii) Any writes made to data already copied must be mirrored to the appropriate place in 'G', 'E' and 'F'
viii) When copy is complete, update zone table with new layout type and set pointers to 'A'/'G', 'E'/'C' and 'F'
ix) Mark 'B' regions as free.

The following describes the general process of contracting from quad drive stripe to triple drive stripe (first ⅓ missing) in accordance with an exemplary embodiment of the invention:

i) Assuming that stripe consists of data blocks 'A', 'B', 'C' and 'D' on different drives. Data 'A' is missing.
ii) Define 'A' as containing the $1^{st}$ third, 'B' as the $2^{nd}$ third and 'C' as the $3^{rd}$ third of the zone and 'D' as the parity.
iii) Allocate 4 regions 'E' on the 'B' drive, 2 regions 'F' on the 'C' drive and 6 regions 'G' on the 'D' drive.
iv) Copy second half of 'B' to 'F'
v) Construct missing data from 'B', 'C' and 'D' and write to 'E'
vi) Construct new parity from 'E'/$1^{st}$ half B' and 'F'/'C' and write to 'G'
vii) Any writes made to data already copied must be mirrored to the appropriate place in 'B', 'E', 'F' and 'G'
viii) When copy is complete, update zone table with new layout type and set pointers to 'E'/$1^{st}$ half B' and 'F'/'C' and 'G'
ix) Mark $2^{nd}$ half 'B' and 'D' regions as free.

The following describes the general process of contracting from quad drive stripe to triple drive stripe (second ⅓ missing) in accordance with an exemplary embodiment of the invention:

i) Assuming that stripe consists of data blocks 'A', 'B', 'C' and 'D' on different drives. Data 'B' is missing.
ii) Define 'A' as containing the $1^{st}$ third, 'B' as the $2^{nd}$ third and 'C' as the $3^{rd}$ third of the zone and 'D' as the parity.
iii) Allocate 2 regions 'E' on the 'A' drive, 2 regions 'F' on the 'C' drive and 6 regions 'G' on the 'D' drive.
iv) Construct missing data from $1^{st}$ half 'A', $1^{st}$ half 'C' and $1^{st}$ half 'D' and write to 'E'
v) Construct missing data from $2^{nd}$ half 'A', $2^{nd}$ half 'C' and $2^{nd}$ half 'D' and write to 'F'
vi) Construct new parity from 'A'/'E' and 'F'/'C' and write to 'G'
vii) Any writes made to data already copied must be mirrored to the appropriate place in 'E', 'F' and 'G'
viii) When copy is complete, update zone table with new layout type and set pointers to 'E', 'F' and 'G'
ix) Mark 'D' regions as free.

The following describes the general process of contracting from quad drive stripe to triple drive stripe (third ⅓ missing) in accordance with an exemplary embodiment of the invention:

i) Assuming that stripe consists of data blocks 'A', 'B', 'C' and 'D' on different drives. Data 'C' is missing.
ii) Define 'A' as containing the $1^{st}$ third, 'B' as the $2^{nd}$ third and 'C' as the $3^{rd}$ third of the zone and 'D' as the parity.
iii) Allocate 2 regions 'E' on the 'A' drive, 4 regions 'F' on the 'B' drive and 6 regions 'G' on the 'D' drive.
iv) Copy $1^{st}$ half 'B' to 'E'
v) Construct missing data from 'A', 'B' and 'D' and write to 'F'
vi) Construct new parity from 'A'/'E' and $2^{nd}$ half 'B'/'F' and write to 'G'
vii) Any writes made to data already copied must be mirrored to the appropriate place in 'E', 'F' and 'G'
viii) When copy is complete, update zone table with new layout type and set pointers to 'A'/'E' and $2^{nd}$ half 'B'/'F' and 'G'
ix) Mark $1^{st}$ half 'B' and 'D' regions as free.

For example, with reference again to FIG. 3, dual drive mirror (Zone B) could be reconstructed on Drive 2 if either Drive 0 or Drive 1 is lost, provided there is sufficient space available on Drive 2. Similarly, three drive stripe (Zone C) could be reconstructed utilizing Drive 3 if any of Drives 0-2 are lost, provided there is sufficient space available on Drive 3.

Data Layout Scheme—Zone Reconstruction

Zone reconstruction occurs when a drive has been removed and there is enough space on the remaining drives for ideal zone re-layout or the drive has been replaced with a new drive of larger size.

The following describes the general process of dual drive mirror reconstruction in accordance with an exemplary embodiment of the invention:

i) Assuming single drive mirror has data 'A' and missing mirror 'B'
ii) Allocate 12 regions 'C' on a drive other than that containing 'A'
iii) Copy data 'A' to 'C'
iv) Any writes made to data already copied must be mirrored to the appropriate place in 'C'
v) When copy is complete, update zone table pointers to 'B' with pointers to 'C'

The following describes the general process of three drive stripe reconstruction in accordance with an exemplary embodiment of the invention:

i) Assume one drive has data 'A', a second drive has data 'B' and a third has parity 'P'. 'B' is missing. Note it doesn't matter which piece is missing, the required action is the same in all cases.
ii) Allocate 6 regions 'D' on a drive other than that containing 'A' and 'P'
iii) Construct missing data from 'A' and 'P'. Write data to 'D'
iv) Any writes made to data already processed must be parity'd to the appropriate place in 'D'
v) Update zone table by replacing pointers to 'B' with pointers to 'D'

In this exemplary embodiment, four-drive-reconstruction can only occur if the removed drive is replaced by another drive. The reconstruction consists of allocating six regions on the new drive and reconstructing the missing data from the other three region sets.

Data Layout Scheme—The Temporarily Missing Drive Problem

When a drive is removed and there is no room for re-layout, the array will continue to operate in degraded mode until either the old drive is plugged back in or the drive is replaced with a new one. If a new one is plugged in, then the drive set should be rebuilt. In this case, data will be re-laid out. If the old disk is placed back into the array, it will no longer be part of the current disk set and will be regarded as a new disk. However, if a new disk is not placed in the array and the old one is put back in, the old one will still be recognized as being a member of the disk set, albeit an out of date member. In this case, any zones that have already been re-laid out will keep their new configuration and the regions on the old disk will be freed. Any zone that has not been re-laid out will still be pointing at the appropriate regions of the old disk. However, as some writes may have been performed to the degraded zones, these zones need to be refreshed. Rather than logging every write that has occurred, degraded regions that have been modified may be marked. In this way, when the disk is replaced, only the regions that have been modified need to be refreshed.

Furthermore, zones that have been written to may be placed further up the priority list for re-layout. This should reduce the number of regions that need to be refreshed should the disk be replaced. A timeout may also be used, after which point the disk, even if replaced, will be wiped. However, this timeout could be quite large, possibly hours rather than minutes.

Data Layout Scheme—Data Integrity

As discussed above, one problem with a standard RAID system is that it is possible for disc-surface corruption to occur on an infrequently used area of the disk array. In the event that another drive fails, it is not always possible to determine that corruption has occurred. In such a case, the corrupted data may be propagated and preserved when the RAID array rebuilds the failed drive.

The hash mechanism discussed above provides an additional mechanism for data corruption detection over that which is available under RAID. As is mentioned elsewhere, when a chunk is stored, a hash value is computed for the chunk and stored. Any time the chunk is read, a hash value for the retrieved chunk can be computed and compared with the stored hash value. If the hash values do not match (indicating a corrupted chunk), then chunk data can be recovered from redundant data.

In order to minimize the time window in which data corruption on the disk can occur, a regular scan of the disks will be performed to find and correct corrupted data as soon as possible. It will also, optionally, allow a check to be performed on reads from the array.

Data Layout Scheme—Volume

Figure 8:
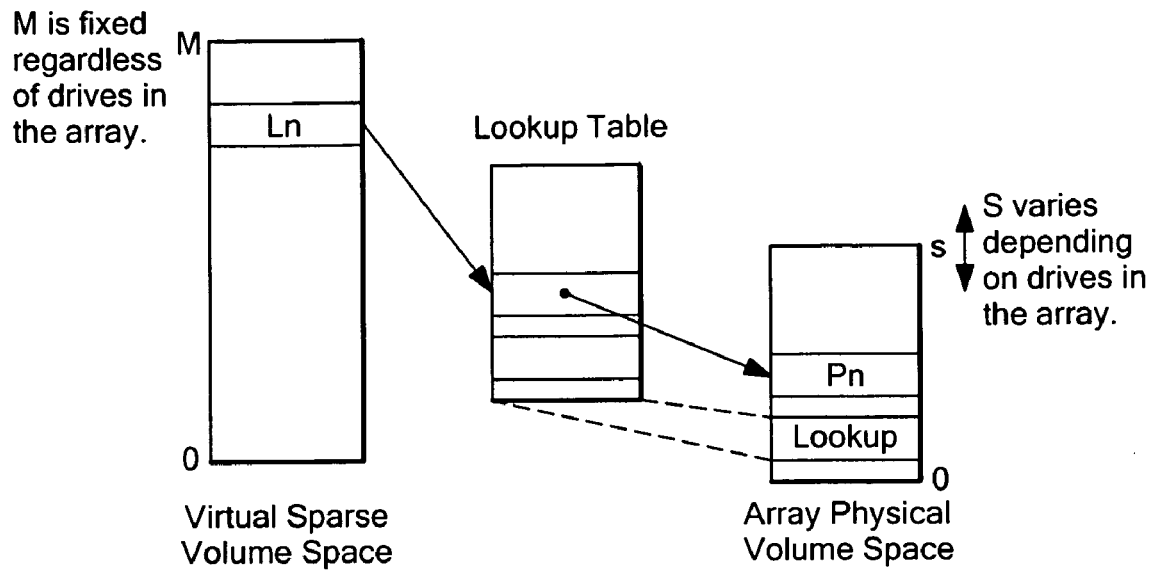
FIG. 8 shows a lookup table for implementing sparse volumes.

In a sparse volume, regardless of the amount of storage space available on discs in the array, the array always claims to be a fixed size—for example, M Terabytes. Assume that the array contains S bytes of actual storage space, where $S<=M$, and that data can be requested to be stored at locations L1, L2, L3, etc. within the M Terabyte space. If the requested location Ln>S, then the data for Ln must be stored at a location Pn<S. This is managed by including a lookup table to index Pn based on Ln, as shown in FIG. 8. The feature is allows the array to work with operating systems that do not support volume expansion, such as Windows, Linux, and Apple operating systems. In addition, the array can provide multiple Sparse Volumes which all share the same physical storage. Each sparse volume will have a dedicated lookup table, but will share the same physical space for data storage.

Drive Slot Indicators

As discussed above, the storage array consists of one or more drive slots. Each drive slot can either be empty or contain a hard disk drive. Each drive slot has a dedicated indicator capable of indicating four states: Off, OK, Degraded and Fail. The states are interpreted generally as follows:

| Indicator State | Meaning for Array User |
| --- | --- |
| Off | Drive slot is empty and is available for an additional drive to be inserted. |
| OK | Drive in slot is functioning correctly. |
| Degraded | Action by user recommend: if slot is empty, add a drive to this slot; if slot contains a drive, replace drive with another, higher-capacity drive. |
| Fail | Action by user required ASAP: if slot is empty, add a drive to this slot; if slot contains a drive, replace drive with another, higher-capacity drive. |

In this exemplary embodiment, red/amber/green light emitting diodes (LEDs) are used as the indicators. The LEDs are interpreted generally as follows:

| LED state | Indicator State | Example circumstances under which state may occur | FIGS. |
| --- | --- | --- | --- |
| Off | Off | Slot is empty. Array has available space. | 9, 10, 12 |
| Green | OK | Drive is functioning correctly, array data is redundant and array has available disk space. | 9, 10, 11, 12 |
| Amber | Degraded | Array is approaching a Fail condition; Not enough space to maintain redundant data in the event of a disc failure. | 11 |
| Red | Fail | Disk in this slot has failed and must be replaced; the array does not have enough space to maintain redundant data storage and more space must be added. | 10, 12 |

Figure 9:
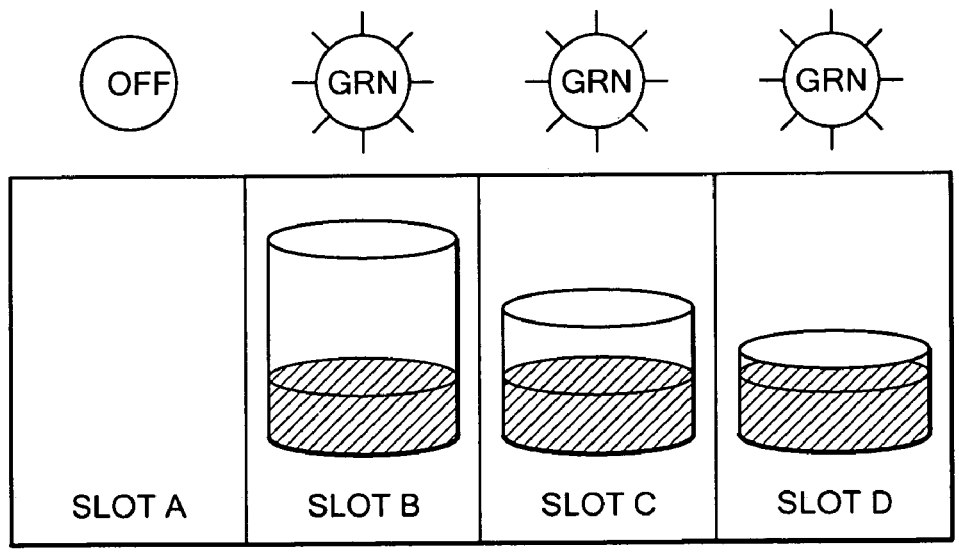
FIG. 9 shows status indicators for an exemplary array having available storage space and operating in a fault-tolerant manner, in accordance with an exemplary embodiment of the present invention.

FIG. 9 shows an exemplary array having available storage space and operating in a fault-tolerant manner, in accordance with an exemplary embodiment of the present invention. Slots B, C, and D are populated with storage devices, and there is sufficient storage space available to store additional data redundantly. The indicators for slots B, C, and D are green (indicating that these storage devices are operating correctly, the array data is redundant, and the array has available disk space), and the indicator for slot A is off (indicating that no storage device needs to be populated in slot A).

Figure 10:
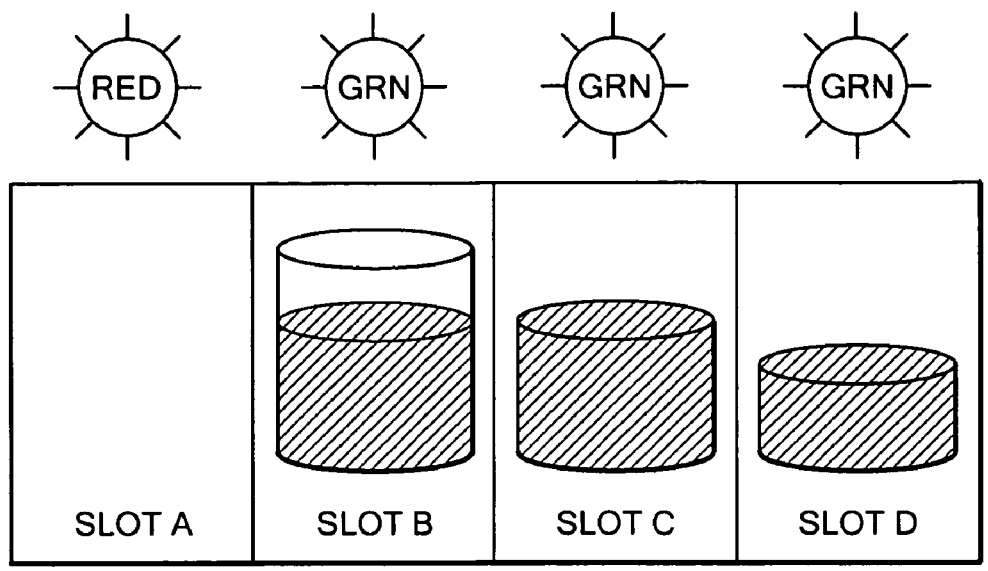
FIG. 10 shows status indicators for an exemplary array that does not have enough space to maintain redundant data storage and more space must be added, in accordance with an exemplary embodiment of the present invention.

FIG. 10 shows an exemplary array that does not have enough space to maintain redundant data storage and more space must be added, in accordance with an exemplary embodiment of the present invention. Slots B, C, and D are populated with storage devices. The storage devices in slots C and D are full. The indicators for slots B, C, and D are green (indicating that these storage devices are operating correctly), and the indicator for slot A is red (indicating that the array does not have enough space to maintain redundant data storage and a storage device should be populated in slot A).

Figure 11:
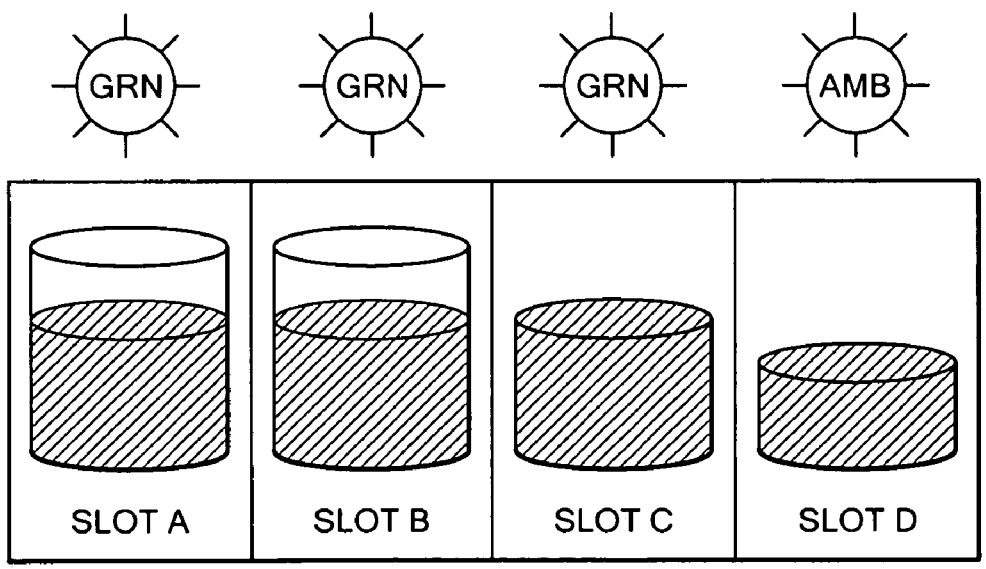
FIG. 11 shows status indicators for an exemplary array that would be unable to maintain redundant data in the event of a failure, in accordance with an exemplary embodiment of the present invention.

FIG. 11 shows an exemplary array that would be unable to maintain redundant data in the event of a failure, in accordance with an exemplary embodiment of the present invention. Slots A, B, C, and D are populated with storage devices. The storage devices in slots C and D are full. The indicators for slots A, B, and C are green (indicating that they are operating correctly), and the indicator for slot D is amber (indicating that the storage device in slot D should be replaced with a storage device having greater storage capacity).

Figure 12:
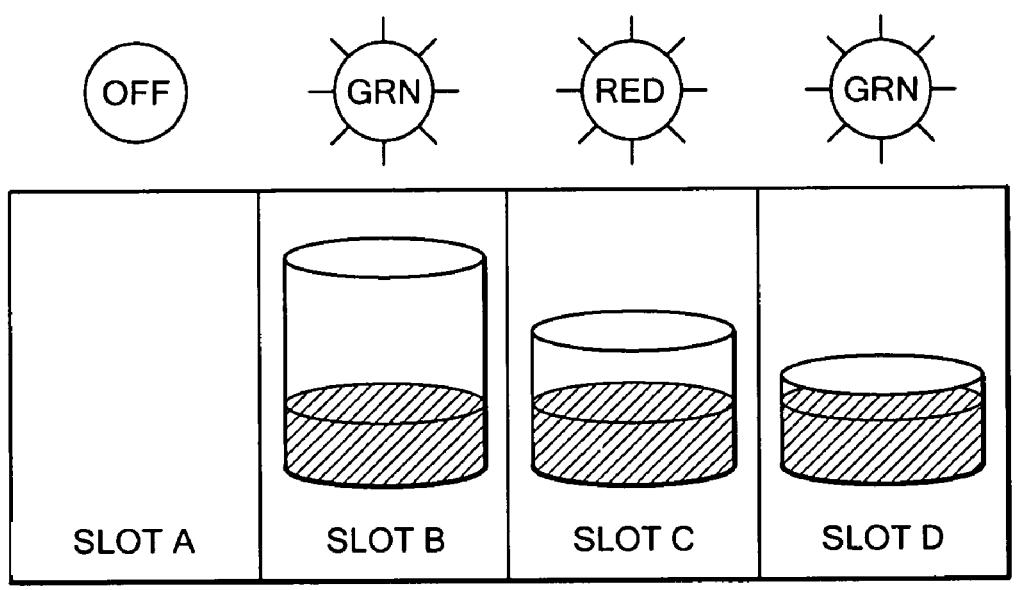
FIG. 12 shows status indicators for an exemplary array in which a storage device has failed, in accordance with an exemplary embodiment of the present invention. Slots B, C, and D are populated with storage devices.

FIG. 12 shows an exemplary array in which a storage device has failed, in accordance with an exemplary embodiment of the present invention. Slots B, C, and D are populated with storage devices. The storage device in slot C has failed. The indicators for slots B and D are green (indicating that they are operating correctly), the indicator for slot C is red (indicating that the storage device in slot C should be replaced), and the indicator for slot A is off (indicating that no storage device needs to be populated in slot A).

The following is a description of the software design for an exemplary embodiment of the present invention. The software design is based on six software layers, which span the logical architecture from physically accessing the disks to communicating with the host computing system.

In this exemplary embodiment, a file system resides on a host server, such as a Windows, Linux, or Apple server, and accesses the storage array as a USB or iSCSI device. Physical disk requests arriving over the host interface are processed by the Host Request Manager (HRM). A Host I/O interface coordinates the presentation of a host USB or iSCSI interface to the host, and interfaces with the HRM. The HRM coordinates data read/write requests from the host I/O interface, dispatches read and write requests, and co-ordinates the retiring of these requests back to the host as they are completed.

An overarching aim of the storage array is to ensure that once data is accepted by the system, it is stored in a reliable fashion, making use of the maximum amount of redundancy the system currently stores. As the array changes physical configuration, data is re-organized so as to maintain (and possibly maximize) redundancy. In addition, simple hash based compression is used to reduce the amount of storage used.

The most basic layer consists of disk drivers to store data on different disks. Disks may be attached via various interfaces, such as ATA tunneled over a USB interface.

Sectors on the disks are organized into regions, zones, and clusters, each of which has a different logical role.

Regions represent a set of contiguous physical blocks on a disk. On a four drive system, each region is 1/12 GB in size, and represents minimal unit of redundancy. If a sector in a region is found to be physically damaged, the whole region will be abandoned.

Zones represent units of redundancy. A zone will consist of a number of regions, possibly on different disks to provide the appropriate amount of redundancy. Zones will provide 1 GB of data capacity, but may require more regions in order to provide the redundancy. 1 GB with no redundancy require one set of 12 regions (1 GB); a 1 GB mirrored zone will require 2 sets of 1 GB regions (24 regions); a 1 GB 3-disk stripped zone will require 3 sets of 0.5 GB regions (18 regions). Different zones will have different redundancy characteristics.

Clusters represent the basic unit of compression, and are the unit size within zones. They are currently 4 KB: 8×512 byte sectors in size. Many clusters on a disk will likely contain the same data. A cluster access table (CAT) is used to track the usage of clusters via a hashing function. The CAT translates between logical host address and the location of the appropriate cluster in the zone.

When writing to disk, a hash function is used to see if the data is already present on the disk. If so, the appropriate entry in the CAT table is set to point to the existing cluster.

The CAT table resides in its own zone. If it exceeds the size of the zone, an additional zone will be used, and a table will be used to map logical address to the zone for that part of the CAT. Alternatively, zones are pre-allocated to contain the CAT table.

In order to reduce host write latency and to ensure data reliability, a journal manager will record all write requests (either to disk, or to NVRAM). If the system is rebooted, journal entries will be committed on reboot.

Disks may come and go, or regions may be retired if they are found to have corruption. In either of these situations, a layout manager will be able to re-organize regions within a zone in order to change its redundancy type, or change the regional composition of a zone (should a region be corrupted).

As the storage array provides a virtual disk array, backed by changing levels of physical disk space, and because it presents a block level interface, it is not obvious when clusters are no longer in use by the file system. As a result, the cluster space used will continue to expand. A garbage collector (either located on the host or in firmware) will analyze the file system to determine which clusters have been freed, and remove them from the hash table.

The following table shows the six software layers in accordance with this exemplary embodiment of the invention:

---

Layer 5: Garbage collector, Host Interface (USB/iSCSI)
Layer 4: Host request manager
Layer 3: CAT, HASH, Journal manager
Layer 2: Zones manager. Allocates/frees chunks of sectors called Zones. Knows about SDM, DDM, SD3 etc in order to deal with errors and error recovery. Layout Manager
Layer 1: Read/write physical clusters/sectors. Allocates Regions per disk
Layer 0: Disk access drivers

---

Figure 13:
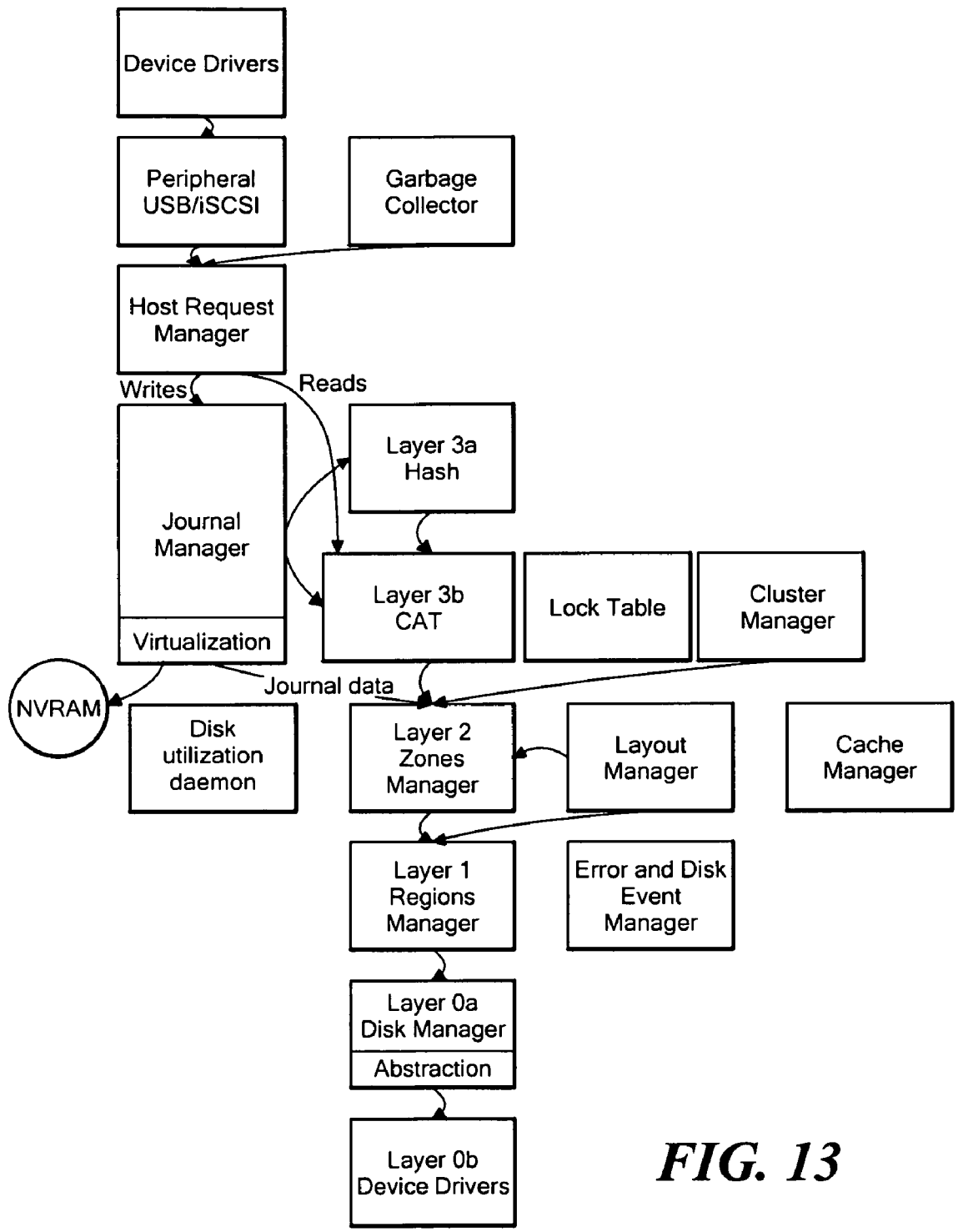
FIG. 13 shows a module hierarchy representing the different software layers of an exemplary embodiment and how they relate to one another.

FIG. 13 shows a module hierarchy representing the different software layers and how they relate to one another. Software layering is preferably rigid in order to present clear APIs and delineation.

The Garbage Collector frees up clusters which are no longer used by the host file system. For example, when a file is deleted, the clusters that were used to contain the file are preferably freed.

The Journal Manager provides a form of journaling of writes so that pending writes are not lost in the case of a power failure or other error condition.

The Layout Manager provides run-time re-layout of the Zones vis-à-vis their Regions. This may occur as a result of disk insertion/removal or failure.

The Cluster Manager allocates clusters within the set of data Zones. The Disk Utilization Daemon checks for free disk space on a periodic basis.

The Lock Table deals with read after write collision issues.

The Host Request Manager deals with the read/write requests from the Host and Garbage Collector. Writes are passed to the Journal Manager, whereas Reads are processed via the Cluster Access Table (CAT) Management layer.

As discussed above, in typical file systems, some amount of the data will generally be repetitive in nature. In order to reduce disk space utilization, multiple copies of this data are not written out to the disks. Instead, one instance is written, and all other instances of the same data are referenced to this one instance.

In this exemplary embodiment, the system operates on a cluster of data at any time (e.g., 8 physical sectors), and this is the unit that is hashed. The SHA1 algorithm is used to generate a 160-bit hash. This has a number of benefits, including good uniqueness, and being supported on-chip in a number of processors. All 160-bits will be stored in the hash record, but only the least significant 16-bits will be used as an index into a hash table. Other instances matching the lowest 16-bits will be chained via a linked-list.

In this exemplary embodiment, only one read/write operation may occur at a time. For performance purposes, hash analysis is not permitted to happen when writing a cluster to disk. Instead, hash analysis will occur as a background activity by the hash manager.

Write requests are read from the journal's write queue, and are processed to completion. In order to ensure data consistency, writes must be delayed if a write operation is already active on the cluster. Operations on other clusters may proceed un-impeded.

Unless a whole cluster is being written, the data being written will need to be merged with the existing data stored in the cluster. Based on the logical sector address (LSA), the CAT entry for the cluster is located. The hash key, zone and cluster offset information is obtained from this record, which can then be used to search the hash table to find a match. This is the cluster.

It might well be necessary to doubly hash the hash table; once via the SHA1 digest, and then by the zone/cluster offset to improve the speed of lookup of the correct hash entry. If the hash record has already been used, the reference count is decremented. If the reference count is now zero, and there is no snapshot referenced by the hash entry, the hash entry and cluster can be freed back to their respective free lists.

The original cluster data is now merged with the update section of the cluster, and the data is re-hashed. A new cluster is taken off the free-list, the merged data is written to the cluster, new entry is added to the hash table, and the entry in the CAT table is updated to point to the new cluster.

As a result of updating the hash table, the entry is also added to an internal queue to be processed by a background task. This task will compare the newly added cluster and hash entry with other hash entries that match the hash table row address, and will combine records if they are duplicates, freeing up hash entries and CAT table entries as appropriate. This ensures that write latency is not burdened by this activity. If a failure (e.g., a loss of power) occurs during this processing, the various tables can be deleted, with a resulting loss of data. The tables should be managed in such a way that the final commit is atomic or the journal entry can be re-run if it did not complete fully.

The following is pseudocode for the write logic:

```
While (stuff to do)
writeRecord = journalMgr.read( );
```

```
lsa = writeRecord.GetLsa( );
catEntry = catMgr.GetCATEntry(lsa);
if (catMgr.writeInProgress(catEntry)) delay( );
originalCluster = catMgr.readCluster(catEntry);
originalHash = hashMgr.calcHash(originalCluster);
hashRecord = hashMgr.Lookup(originalHash, zone, offset);
if ((hashRecord.RefCount == 1) && (hashRecord.snapshot == 0))
    hashRecord.free( );
    originalCluster.free( );
    // Note there are some optimizations here where we can reuse
    // this cluster without having to free & re-allocate it.
// otherwise, still users of this cluster, so update & leave it alone
hashRecord.RefCount--;
hashRecord.Update(hashRecord);
// Now add new record
mergedCluster = mergeCluster(originalCluster, newCluster);
newHash = hashMgr.calcHash(mergedCluster);
newCluster = clusterMgr.AllocateCluster(zone, offset);
clusterMgr.write(cluster, mergedCluster);
zoneMgr.write(cluster, mergedCluster);
...
hashMgr.addHash(newHash, newCluster, zone, offset)
    (internal: queue new hash for background processing)
catMgr.Update(lba, zone, offset, newHash);
// We've completed the journal entry successfully. Move on to the next
one.
journalMgr.next( );
```

Read requests are also processed one cluster (as opposed to "sector") at a time. Read requests do not go through the hash-related processing outlined above. Instead, the host logical sector address is used to reference the CAT and obtain a Zone number and cluster offset into the Zone. Read requests should look up the CAT table entry in the CAT Cache, and must be delayed in the write-in-progress bit is set. Other reads/writes may proceed un-impeded. In order to improve data integrity checking, when a cluster is read, it will be hashed, and the hash compared with the SHA1 hash value stored in the hash record. This will require using the hash, zone and cluster offset as a search key into the hash table.

Clusters are allocated to use as few Zones as possible. This is because Zones correspond directly to disk drive usage. For every Zone, there are two or more Regions on the hard drive array. By minimizing the number of Zones, the number of physical Regions is minimized and hence the consumption of space on the hard drive array is reduced.

The Cluster Manager allocates cluster from the set of Data Zones. A linked list is used to keep track of free clusters in a Zone. However, the free cluster information is stored as a bit map (32 KB per Zone) on disk. The linked list is constructed dynamically from the bitmap. Initially, a linked list of a certain number of free clusters is created in memory. When clusters are allocated, the list shrinks. At a predetermined low-water mark, new linked list nodes representing free clusters are extracted from the bitmap on disk. In this way, the bitmap does not need to be parsed in order to find a free cluster for allocation.

In this exemplary embodiment, the hash table is a 64 K table of records (indexed by the lower 16 bits of the hash) and has the following format:

| Offset | Size in bits | Name | Value/Valid Range | Description |
|---|---|---|---|---|
| 0 | 160 | sha1Hash | | The complete SHA1 hash digest |
| | 16 | refCount | | Number of instances of this hash; what do we do if we get beyond 16 bits? |

| Offset | Size in bits | Name | Value/Valid Range | Description |
|---|---|---|---|---|
| | 18 | Cluster offset | | Cluster offset within zone |
| | 14 | Zone # | | Zone# containing this cluster |
| | 8 | snapshot | | One bit per snapshot instance to indicate that this cluster entry is used by that snapshot. This model supports 8 snapshots (possible only 7) |

A cluster of all zeros may be fairly common, so the all-zeros case may be treated as a special case, for example, such that it can never be deleted (so wrapping the count would not be a problem).

A linked list of free hash record is used when the multiple hashes have the same least significant hash, or when two hash entries point to different data clusters. In either case, a free hash record will be taken from the list, and linked via the pNextHash pointer.

The hash manager will tidy up entries added to the hash table, and will combine identical clusters on the disk. As new hash records are added to the hash table, a message will be posted to the hash manager. This will be done automatically by the hash manager. As a background activity, the hash manager will process entries on its queue. It will compare the full hash value to see if it matches any existing hash records. If it does, it will also compare the complete cluster data. If the clusters match, the new hash record can be discarded back to the free queue, the hash record count will be incremented, and the duplicate cluster will be returned to the cluster free queue. The hash manager must take care to propagate the snapshot bit forward when combining records.

A Cluster Access Table (CAT) contains indirect pointers. The pointers point to data clusters (with 0 being the first data cluster) within Zones. One CAT entry references a single data cluster (tentatively 4 KB in size). CATs are used (in conjunction with hashing) in order to reduce the disk usage requirements when there is a lot of repetitive data. A single CAT always represents a contiguous block of storage. CATs are contained within non-data Zones. Each CAT entry is 48-bits. The following table shows how each entry is laid out (assuming each data Zone contains 1 GB of data):

| Bits 0-17 | Bits 18-31 | Bits 32-47 | Bits 48-63[..] |
|---|---|---|---|
| Offset of data cluster within Zone | Zone# containing data | Hash key | Reserved. Candidates include garbage collector write-bit; snapshot bits; snapshot table hash key |

It is desirable for the CAT to fit into 64 bits, but this is not a necessity. The CAT table for a 2TB array is currently 4 GB in size. Each CAT entry points to a Zone which contains the data and the number of the Zone.

Figure 14:
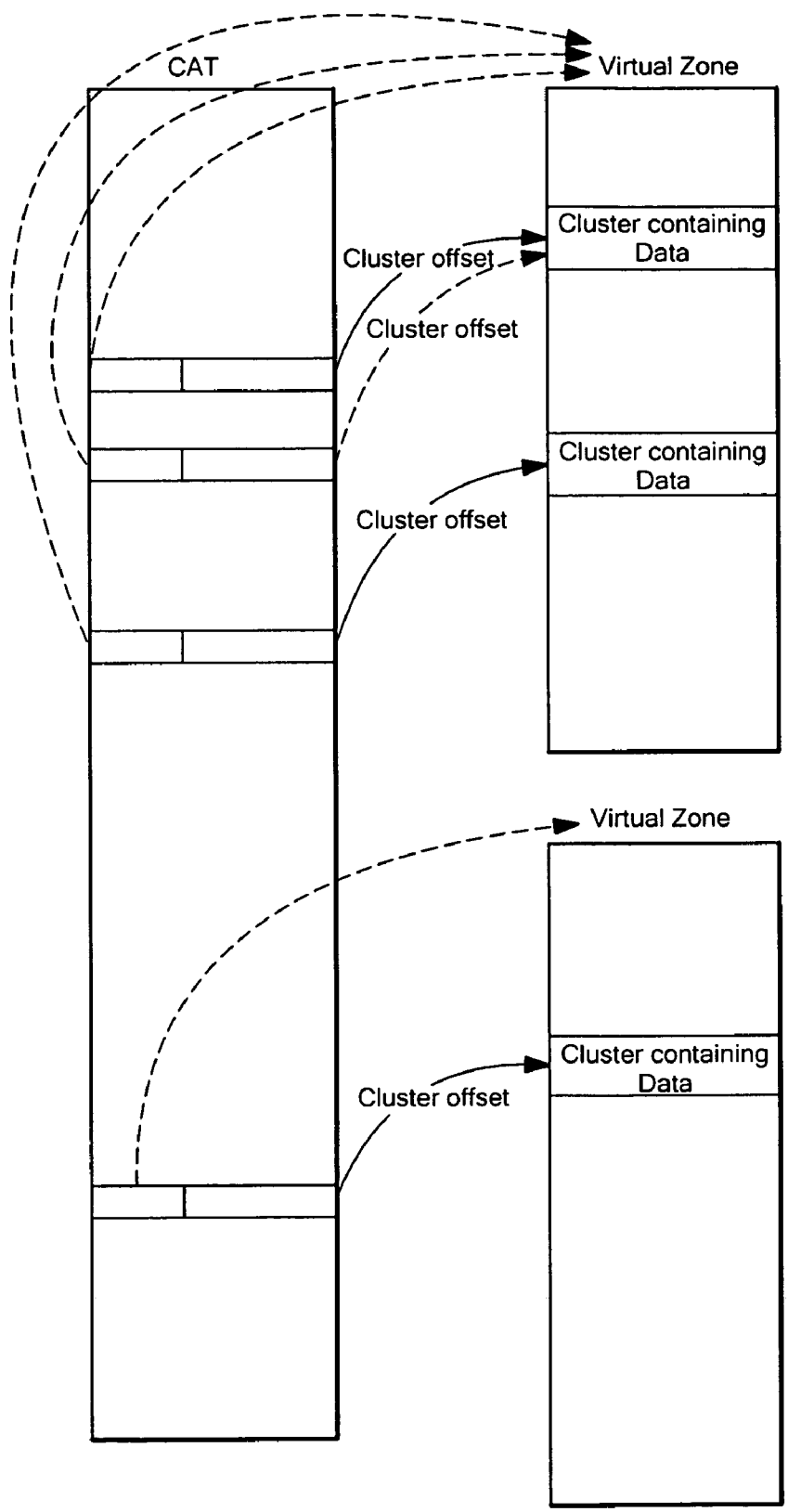
FIG. 14 shows how a cluster access table is used to access a data clusters in a Zone, in accordance with an exemplary embodiment of the present invention.

FIG. 14 shows how the CAT is used to access a data clusters in a Zone. Redundant data is referenced by more than one entry in the CAT. Two logical clusters contain the same data, so their CAT entries are pointed to the same physical cluster.

The Hash Key entry contains the 16-bit extract of the 160-bit SHA1 hash value of the entire cluster. This entry is used to update the hash table during a write operation.

There are enough bits in each entry in the CAT to reference 16TB of data. However, if every data cluster is different from another (in terms of contents), then just over 3 Zones' worth of CAT entries are required to reference 2 TB of data (each zone is 1 GB in size, and hence can store 1 GB/size of CAT entry entries. Assuming 6 byte CAT entries, that is 178956970 CAT entries/zone, i.e. the table references around 682 GB/zone if each cluster is 4 K).

A Host Logical Sector Translation Table is used to translate a Host Logical Sector Address into a Zone number. The portion of the CAT that corresponds to the Host Logical Sector Address will reside in this zone. Note that each CAT entry represents a cluster size of 4096 bytes. This is eight 512 byte sectors. The following shows a representation of the host logical sector translation table:

| Start Host Logical Sector Address | End Host Logical Sector Address | Zone # of CAT |
|---|---|---|
| 0 (cluster #0) | 1431655759 (cluster #178956969) | |
| 1431655760 (cluster #178956970) | ... | |

Zones can be pre-allocated to hold the entire CAT. Alternatively, Zones can be allocated for the CAT as more entries to the CAT are required. Since the CAT maps the 2TB virtual disk to the host sector address space, it is likely that a large part of the CAT will be referenced during hard disk partitioning or formatting by the host. Because of this, the Zones may be pre-allocated.

The CAT is a large 1 GB/zone table. The working set of clusters being used will be a sparse set from this large table. For performance reasons, active entries (probably temporarily) may be cached in processor memory rather than always reading them from the disk. There are at least two options for populating the cache—individual entries from the CAT, or whole clusters from the CAT.

Because the write-in-progress is combined with the CAT cache table, it is necessary to ensure that all outstanding writes remain in the cache. Therefore, the cache needs to be at least as large at the maximum number of outstanding write requests.

Entries in the cache will be a cluster size (ie. 4 K). There is a need to know whether there is a write-in-progress in operation on a cluster. This indication can be stored as a flag in the cache entry for the cluster. The following table shows the format of a CAT cache entry:

| Bits 0-17 | Bits 18-31 | Bits 32-47 | Bit 48-63 |
|---|---|---|---|
| Offset of data cluster within Zone | Zone# containing data | Hash key | Bit 48: Write-in-progress<br>Bit 49: Dirty |

The write-in-progress flag in the cache entry has two implications. First, it indicates that a write is in progress, and any reads (or additional writes) on this cluster must be held off until the write has completed. Secondly, this entry in the cache must not be flushed while the bit is set. This is partly to protect the state of the bit, and also to reflect the fact that this cluster is currently in use. In addition, this means that the size of the cache must be at least as large as the number of outstanding write operations.

One advantage of storing the write-in-progress indicator in the cache entry for the cluster is that it reflects the fact that the operation is current, saves having another table, and it saves an additional hashed-based lookup, or table walk to check this bit too. The cache can be a write-delayed cache. It is only necessary to write a cache entry back to disk when the write operation has completed, although it might be beneficial to have it written back earlier. A hash function or other mechanism could be used to increase the number of outstanding write entries that can be hashed.

An alternate approach is to cache whole clusters of the CAT (i.e., 4 K entry of entries). This would generally help performance if there is good spatial locality of access. Care needs to be taken because CAT entries are 48 bits wide, so there will not be a whole number of entries in the cache. The following table shows an example of a clustered CAT cache entry:

| 2 words | 2 words | 2 words | 2 words |
|---|---|---|---|
| CAT entry 1 (partial entry of last 2 words) | CAT Entry 2 | | |
| CAT Entry 3 | | | CAT Entry 4 |
| CAT Entry 4 | CAT Entry 5 | | |
| CAT Entry 5 | CAT Entry 6 | | |
| .... | | | |
| CAT Entry 682 | | CAT Entry 683 (partial entry of first 2 words) | |
| Write-in-progress bit array [682 bits]: bits 0-255 | | | |
| Write-in-progress bit array bits 256-511 | | | |
| Write-in-progress bit array 512-682 + spare bits | | Dirty count | Reserved |

The table size would be 4096+96 (4192 bytes). Assuming it is necessary to have a cache size of 250 entries, the cache would occupy approximately 1 MB.

It is possible to calculate whether the first and last entry is incomplete or not by appropriate masking of the logical CAT entry address. The caching lookup routine should do this prior to loading an entry and should load the required CAT cluster.

When the host sends a sector (or cluster) read request, it sends over the logical sector address. The logical sector address is used as an offset into the CAT in order to obtain the offset of the cluster in the Zone that contains the actual data that is requested by the host. The result is a Zone number and an offset into that Zone. That information is passed to the Layer 2 software, which then extracts the raw cluster(s) from the drive(s).

In order to deal with clusters that have never been written to by the host, all CAT entries are initialized to point to a "Default" cluster which contain all zeros.

The journal manager is a bi-level write journaling system. An aim of the system is to ensure that write requests can be accepted from the host and quickly indicate back to the host that the data has been accepted while ensuring its integrity. In addition, the system needs to ensure that there will be no corruption or loss of any block level data or system metadata (e.g., CAT and Hash table entries) in the event of a system reset during any disk write.

The J1 journal manager caches all write requests from the hosts to disk as quickly as possible. Once the write has successfully completed (i.e., the data has been accepted by the array), the host can be signaled to indicate that the operation has completed. The journal entry allows recovery of write requests when recovering from a failure. Journal records consist of the data to be written to disk, and the meta-data associated with the write transaction.

In order to reduce disk read/writes, the data associated with the write will be written to free clusters. This will automatically mirror the data. Free clusters will be taken from the free cluster list. Once the data is written, the free cluster list must be written back to disk.

A journal record will be written to a journal queue on a non-mirrored zone. Each record will be a sector in size, and aligned to a sector boundary in order to reduce the risk that a failure during a journal write would corrupt a previous journal entry. Journal entries will contain a unique, incrementing sequence count at the end of the record so that the end of a queue can easily be identified.

Journal write operations will happen synchronously within a host queue processing thread. Journal writes must be ordered as they are written to disk, so only one thread may write to the journal as any time. The address of the journal entry in the J1 table can be used as a unique identifier so that the J1 journal entry can be correlated with entries in the J2 journal. Once the journal entry is written, a transaction completion notification will be posted to the host completion queue. Now the write operation can be executed. It is important to ensure that any subsequent reads to a cluster before the journal write has completed are delayed.

The following table shows the format of the J2 journal record:

| Size in bits | Name | Details |
|---|---|---|
| 32 | LBA | Logical Block Address |
| 14 | Zone | Zone # of associated cluster |
| 18 | Offset | Cluster offset of associated cluster |
| 16 | Size | Size of data |
| 16 | SequenceNumber | An incrementing sequence number so we can easily find the end of the queue |

Each journal record will be aligned to a sector boundary. A journal record might contain an array of zone/offset/size tuples.

Figure 15:
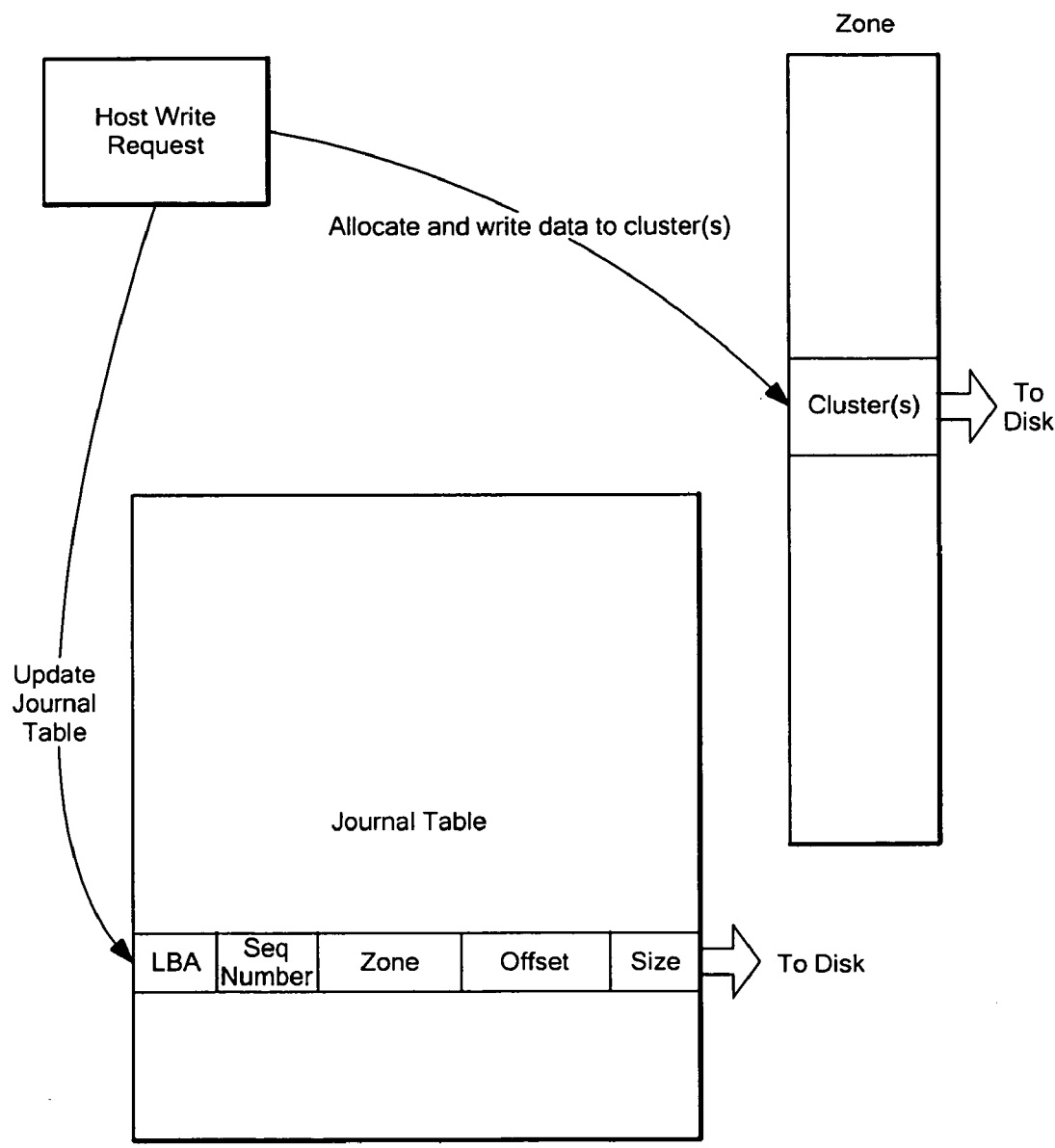
FIG. 15 shows a journal table update in accordance with an exemplary embodiment of the present invention.

FIG. 15 shows a journal table update in accordance with an exemplary embodiment of the present invention. Specifically, when a host write request is received, the journal table is updated, one or more clusters are allocated, and data is written to the cluster(s).

Host journal requests are processed. These cause clusters to be written, and also cause updates to meta-data structure which must be shadowed back to disk (for example, the CAT table). It is important to ensure that these meta-data structures are correctly written back to disk even if a system reset occurs. A low level disk I/O write (J2) journal will be used for this.

In order to process a host interface journal entry, the appropriate manipulation of meta-data structures should be determined. The changes should occur in memory and a record of changes to various disk blocks be generated. This record contains the actual changes on disk that should be made. Each data structure that is updated is registered with the J2 journal manager. This record should be recorded to a disk based journal, and stamped with an identifier. Where the record is connected with a J1 journal entry, the identifiers should be linked. Once the record is stored, the changes to disk can be made (or can be done via a background task).

The J2 journal exists logically at layer 3. It is used to journal meta-data updates that would involve writes through the zone manager. When playback of a journal entry occurs, it will use zone manager methods. The journal itself can be stored in a specialized region. Given the short lifespan of journal entries, they will not be mirrored.

Not all meta-data updates need to go through the J2 journal, particularly if updates to structures are atomic. The region manager structure may not use the J2 journal. It would be possible to detect inconsistencies in the region manager bitmap, for example, with an integrity checking background thread.

A simple approach for the J2 journal is to contain a single record. As soon as the record is committed to disk, it is replayed, updating the structures on disk. It is possible to have multiple J2 records and to have a background task committing updating records on disks. In this case, close attention will need to be paid to the interaction between the journal and any caching algorithms associated with the various data structures.

The initial approach will run the journal entry as soon as it has been committed to disk. In principle there could be multiple concurrent users of the J2, but the J2 journal may be locked to one user at a time. Even in this case, journal entries should be committed as soon as they have been submitted.

It is important to ensure that the meta-data structures are repaired before any higher level journal activity occurs. On system reboot, the J2 journal is analyzed, and any records will be replayed. If a journal entry is correlated with a J1 journal entry, the J1 entry will be marked as completed, and can be removed. Once all J2 journal entries have been completed, the meta-data is in a reliable state and any remaining J1 journal entries can be processed.

The J2 journal record includes the following information:
Number of operations
Each operation contains:
  J1 record indicator
  Zone/Data offset to write to
  Data to write
  Size of data
  Offset into data cluster
Journal record identifier
End Marker This scheme could operate similarly to the J1 journal scheme, for example, with a sequence number to identify the end of a J2 journal entry and placing J2 journal entries on sector boundaries.

If the J1 data pointer indicator is set, then this specific operation would point to a J1 journal record. The host supplied write data would not have to be copied into our journal entry. The operation array should be able to be defined as a fixed size as the maximum number of operations in a journal record is expected to be well understood.

In order to permit recovery from corruption of a sector during a low level write operation (e.g., due to a loss of power), the J2 journal could store the whole sector that was written so that the sector could be re-written from this information if necessary. Alternatively or additionally, a CRC calculated for each modified sector could be stored in the J2 record and compared with a CRC computed from the sector on disk (e.g., by the zone manager) in order to determine whether a replay of the write operation is required.

The different journals can be stored in different locations, so there will be an interface layer provided to write journal records to backing store. The location should be non-volatile. Two candidates are hard disk and NVRAM. If the J1 journal is stored to hard disk, it will be stored in a J1 journal non-mirrored zone. The J1 journal is a candidate for storing in NVRAM. The J2 journal should be stored on disk, although it can be stored in a specialized region (i.e., not redundant, as it has a short lifespan). An advantage of storing the J2 journal on disk is that, if there is a system reset during an internal data structure update, the data structures can be returned to a consistent state (even if the unit is left un-powered for a long period of time).

The Zones Manager (ZM) allocates Zones that are needed by higher level software. Requests to the ZM include:
  a. Allocate Zone
  b. De-allocate/Free Zone
  c. Control data read/write pass through to L1 (?)
  d. Read/Write cluster in a Zone (given the offset of the cluster and the Zone number)

The ZM manages the redundancy mechanisms (as a function of the number of drives and their relative sizes) and handles mirroring, striping, and other redundancy schemes for data reads/writes.

When the ZM needs to allocate a Zone, it will request an allocation of 2 or more sets of Regions. For example, a Zone may be allocated for 1 GB of data. The Regions that make up this Zone will be able to contain 1 GB of data including redundancy data. For a mirroring mechanism, the Zone will be made up of 2 sets of Regions of 1 GB each. Another example, a 3-disk striping mechanism utilize 3 sets of Regions of ½ GB each.

The ZM uses the ZR translation table (6) to find out the location (drive number and start Region number) of each set of Regions that makes up the Zone. Assuming a 1/12 GB Region size, a maximum of 24 Regions will be needed. 24 Regions make up 2×1 GB Zones. So the ZR translation table contains 24 columns that provide drive/region data.

The ZM works generally as follows:
  a. In the case of SDM (single drive mirroring), 24 columns are used. The drive numbers are the same in all columns. Each entry corresponds to a physical Region on a physical drive that makes up the Zone. The first 12 entries point to Regions that contain one copy of the data. The last 12 entries point to the Regions containing the second copy of the data.
  b. The case of DDM (dual drive mirroring) is the same as SDM except that the drive number on the first 12 entries is different from that in the last 12 entries.
  c. In the case of striping, three or more columns may be used. For example, if striping is used across three drives, six Regions may be needed from three different drives (i.e., 18 entries are used), with the first six entries containing the same drive number, the next six entries containing another drive number, and the following six entries containing a third drive number; the unused entries are zeroed.

The following table shows a representation of the zone region translation table:

| Zone# | Size of Zone | Size of each Region | Usage | Drive/ Region (1) | Drive/ Region (2) | ... | Drive/ Region (23) | Drive/ Region (24) |
|---|---|---|---|---|---|---|---|---|
| 0 | 1 GB | 1/12 | SDM | 0,2000 | 0,1000 | ... | 0,10 | 0,2000 |
| 1 | 1 GB | 1/12 | DDM | 0,8000 | 0,3000 | ... | 1,2000 | 1,10 |
| 2 | 1 GB | 1/12 | SD3 | 3,4000 | 3,3000 | | 4,2000 | 4,1000 |
| ... | | | | | | | | |
| N | | | Free | | | | | |

When a read/write request comes in, the ZM is provided with the Zone number and an offset into that Zone. The ZM looks in the ZR translation table to figure out the redundancy mechanism for that Zone and uses the offset to calculate which Drive/Region contains the sector that must be read/written. The Drive/Region information is then provided to the L1 layer to do the actual read/write. An additional possible entry in the Usage column is "Free". "Free" indicates that the Zone is defined but currently not used.

The cluster manager allocates and de-allocates clusters within the set of data Zones.

The Layout Manager provides run-time re-layout of the Zones vis-à-vis their Regions. This may occur as a result of disk insertion/removal or failure.

The Layer 1 (L1) software knows about physical drives and physical sectors. Among other things, the L1 software allocates Regions from physical drives for use by the Zones Manager. In this exemplary embodiment, each Region has a size of $1/12$ GB (i.e., 174763 sectors) for a four-drive array system. A system with a larger maximum number of drives (8, 12 or 16) will have a different Region size.

In order to create a Zone containing 1 GB of data with SD3 (striping over three drives; two data plus parity), we would end up using six Regions each in three drives ($6 \times 1/12 = 1/2$ GB per drive).

The use of this Region scheme allows us to provide better utilization of disk space when Zones get moved around or reconfigured e.g., from mirroring to striping. The L1 software keeps track of available space on the physical drives with a bitmap of Regions. Each drive has one bitmap. Each Region is represented by two bits in the bitmap in order to track if the Region is free, used, or bad. When the L2 software (ZM) needs to create a Zone, it gets a set of Regions from the L1 layer. The Regions that make up a Zone are not contiguous within a disk.

Requests to L1 include:
a. Data read/write (to a cluster within a group of Regions)
b. Control data read/write (tables, data structures, DIC etc)
c. Allocate physical space for a Region (actual physical sectors within 1 drive)
d. De-allocate Region
e. Raw read/write to physical clusters within a physical drive
f. Copy data from one Region to another
g. Mark region as bad.

The free region bitmap may be large, and therefore searches to find the free entry (worst case is that no entries are free) may be slow. In order to improve performance, part of the bitmap can be preloaded into memory, and a linked list of free regions can be stored in memory. There is a list for each active zone. If a low water mark on the list is reached, more free entries can be read from the disk as a background activity.

The Disk Manager operates at layer 0. As shown in the following table, there are two sub-layers, specifically an abstraction layer and the device drivers that communicate with the physical storage array.

Layer 0a: Abstraction
Layer 0b: OS interface to device drivers and device drivers
Physical Storage Array Hardware The Device Drivers layer may also contain several layers. For example, for a storage array using USB drives, there is an ATA or SCSI stack on top of the USB transport layer. The abstraction layer provides basic read/write functions that are independent of the kinds of drives used in the storage array.

One or more disk access queues may be used to queue disk access requests. Disk access rates will be one of the key performance bottlenecks in our system. We will want to ensure that the disk interface is kept as busy as possible at all times so as to reduce general system latency and improve performance. Requests to the disk interface should have an asynchronous interface, with a callback handler to complete the operation when the disk operation has finished. Completion of one disk request will automatically initiate the next request on the queue. There may be one queue per drive or one queue for all drives.

Layer 1 will reference drives as logical drive numbers. Layer 0 will translate logical drive numbers to physical drive references (e.g., /dev/sda or file device number as a result of an open( ) call). For flexibility (expansion via USB), there should be a queue for each logical drive.

The following are some exemplary object definitions and data flows:

MSG object : incoming from host
    Lba
    Length
    LUN
    Data
REPLY object : outgoing to host
    Status
    Host
    Length
    Data -continued

```
Data Read
Data read flow:
rc=lockm.islocked(MSG)
rc = catm.read(MSG, REPLY)
    status = zonem.read(zone, offset, length, buffer)
        regionm.read(logical_disk, region_number,region_offset,length,buffer)
            diskm.read(logical_disk,offset,length,buffer)
Data Write
Data write flow:
diskutildaemon.spaceavailable( )
journalm.write(MSG)
    lockm.lock(msg)
    zonem.write(journal_zone, offset, length, buffer)
        regionm.write      - journal entry
            diskm.write
        regionm.write      - end marker
            diskm.write
catm.write(MSG)
    catm.readcluster(lba,offset,length,buffer)      - if need to merge sector into cluster
        -   merge
"if(lba already allocated)"
    catm.readhashkey(lba)
    hashm.lookup(hashkey,zone,offset)
    "if(refcount==1)"
        hashentry.getrefcount( )
        hashm.remove(hashentry)
        hasm.add(sha1,zone,offset)
        zonem.write(zone,offset,length,buffer)      - write data
    "else"
        hashentry.removeref( )
        clusterm.allocate(zone,offset)              - allocate new cluster
            zonem.createzone(zone)
                regionm.unusedregions(logical_disk)
regionm.allocate(logical_disk, number_regions, region_list)
zonem.write(...)              - write data
    hashm.add(...)                      - add new entry to hash table
    "endif"
    hashdaemon.add(lba,sha1)            - add to hash daemon Q
    catm.writehashkey(lba,hashkey)      - copy new hash key to CAT
"else"
    catm.update(lba,zone,offset,hashkey)   - update CAT with new entry
    "endif"
journalm.complete(MSG)
    lockm.unlock(MSG)
        - update r/w cursors
```

The following is a description of physical disk layout. As discussed above, each disk is divided into Regions of fixed size. In this exemplary embodiment, each Region has a size of 1/12 GB (i.e., 174763 sectors) for a four-drive array system. A system with a larger maximum number of drives (8, 12 or 16) will have a different Region size. Initially, Region numbers 0 and 1 are reserved for use by the Regions Manager and are not used for allocation. Region number 1 is a mirror of Region number 0. All internal data used by the Regions Manager for a given hard disk is stored in Region numbers 0 and 1 of this hard disk. This information is not duplicated (or mirrored) to other drives. If there are errors in either Region 0 or 1, other Regions can be allocated to hold the data. The Disk Information Structure points to these Regions.

Each disk will contain a DIS that identifies the disk, the disk set to which it belongs, and the layout information for the disk. The first sector on the hard disk is reserved. The DIS is stored in the first non-bad cluster after the first sector. The DIS is contained in 1 KB worth of data. There are two copies of the DIS. The copies of the DIS will be stored on the disk to which it belongs. In addition, every disk in the system will contain a copy of all the DISs of the disks in the system. The following table shows the DIS format:

| Offset | Size | Name | Value/Valid Range | Description |
|---|---|---|---|---|
| 0 | 32 bytes | disStartSigniture | "_DISC INFORMATION CLUSTER START_" | Identifies the cluster as being a possible disc information cluster. Cluster must be CRC'd to check that it is valid. |
| | WORD16 | disVersion | Binary non-zero number | Identifies the structure version. This value is only changed when a material change is made |

-continued

| Offset | Size | Name | Value/Valid Range | Description |
|---|---|---|---|---|
| | | | | to the structure layout or content meaning that makes it incompatible with previous versions of the Firmware. |
| | WORD16 | disClusterSize | Binary non-zero number | The number of 512 byte sectors that make a cluster on this disc. |
| | WORD32 | disCRC | CRC-32 | CRC of the DIS structure. |
| | WORD32 | disSize[!!!] | | Size of DIS cluster (in bytes) |
| | WORD32 | disDiskSet | | The disk set this disk belongs to |
| | WORD32 | disDriveNumber | 0 to 15 | The drive number within the disk set |
| | WORD32 | disSystemUUID | | UUID of the box this disk belongs to |
| | WORD64 | disDiskSize | | Size of the disk in number of sectors |
| | WORD32 | disRegionSize | | Size of Regions in number of sectors |
| | WORD64 | disRegionsStart | | Sector offset to the start of the first Region on the disk |
| | WORD64 | disCopyOffset | | Sector offset to where the copy of this DIS is stored. The disCopyOffset of each DIS reference each other |
| | WORD64 | disDISBackup | | Sector offset to the table containing the copies of the DISs of all the disks |
| | WORD32 | disDISBackupSize | | Number of DISs in the DIS Backup section |
| | WORD32 | disRIS0Region | | Region number of where first copy of the RIS is stored |
| | WORD32 | disRIS0Offset | | Number of sectors offset within the Region to the sector where the Regions Information Structure is located |
| | WORD32 | disRIS1Region | | For the copy of the RIS |
| | WORD32 | disRIS1Offset | | For the copy of the RIS |
| | WORD32 | disZIS0Region | | Region number of Region where the Zones Information Structure is located. This is ONLY used if there is a ZTR on this disk. Otherwise, it is zero. |
| | WORD32 | disZIS0Offset | | Offset to the ZIS within the region |
| | WORD32 | disZIS1Region | | Region number of Region where a copy of the ZIS is located. This is ONLY used in a single drive system. In other cases, this entry is 0. |
| | WORD32 | disZIS1Offset | | Offset to the ZIS within the region |

Regions Manager stores its internal data in a regions information structure. The following table shows the regions information structure format:

| Offset | Size | Name | Value/Valid Range | Description |
|---|---|---|---|---|
| 0 | WORD64 | risSignature | | Indicates that this is a RIS |
| | WORD32 | risSize | | Size of this structure (bytes) |
| | WORD32 | risChecksum | | Checksum |
| | WORD32 | risVersion | | Version of this table (and bitmap) |
| | WORD32 | risDrive | | Logical Drive number |
| | WORD64 | risStartSector | | Absolute start sector (in disk) of Regions utilization bitmap |
| | WORD32 | risSectorOffset | | Sector offset of Regions utilization bitmap within the current Region |
| | WORD32 | risSizeBitmap | | Size of bitmap (in bits?) |
| | WORD64 | risNumberRegions | | Number of regions on this disk (also implies size of bitmap) |

The zones information structure provides information on where the Zones Manager can find the Zones Table. The following shows the zones information structure format:

The following is a description of layout of zones information. The linked list of Zones Table Nodes is placed after the ZIS in the following manner:

| Offset | Size | Name | Value/Valid Range | Description |
|---|---|---|---|---|
| 0 | WORD64 | zisSignature | | Indisates that this is a ZIS |
| 8 | WORD32 | zisSize | | Size of this structure (bytes) |
| 12 | WORD32 | zisChecksum | | Checksum |
| 16 | WORD32 | zisVersion | | Version of this table (and bitmap) |
| 20 | WORD16 | zisFlags | | Bit 0 = 1 if this disk is used to contain the Zones info<br>Bits 14-15: redundancy type (either SDM or DDM only) |
| 22 | WORD16 | zisOtherDrive | | Logical drive number of the drive that contains the other copy of the Zones Table. |
| 24 | WORD32 | zisNumberRegions | | Number of Regions used to contain each copy of the Zones Table. Equal to the number of Zones Table Nodes. |
| 28 | WORD32 | zisStartOffset | | Byte offset pointing to start of linked list of Regions that are used to contain the Zones Table. Each entry in the linked list is called 'Zones Table Node" |
| | WORD32 | zisNumberofZones | | Number of Zones (entries in Zones Table) in the system |
| | WORD32 | zisZoneSize | | Size of zones in bytes |

High level information zones contain the Zone tables and other tables used by the high level managers. These will be protected using mirroring.

The following table shows the zones table node format:

| Size | Name | Description |
|---|---|---|
| WORD32 | ztNextEntry | Pointer to next entry in linked list |
| WORD32 | ztCount | Count of this entry |
| WORD64 | ztRegion | Region number |

| Zones Information Structure |
|---|
| First Zones Table Node (16bytes) |
| ... |
| Last Zones Table Node (16 bytes) |

This information is stored in the Zones Table Region.

Figure 16:
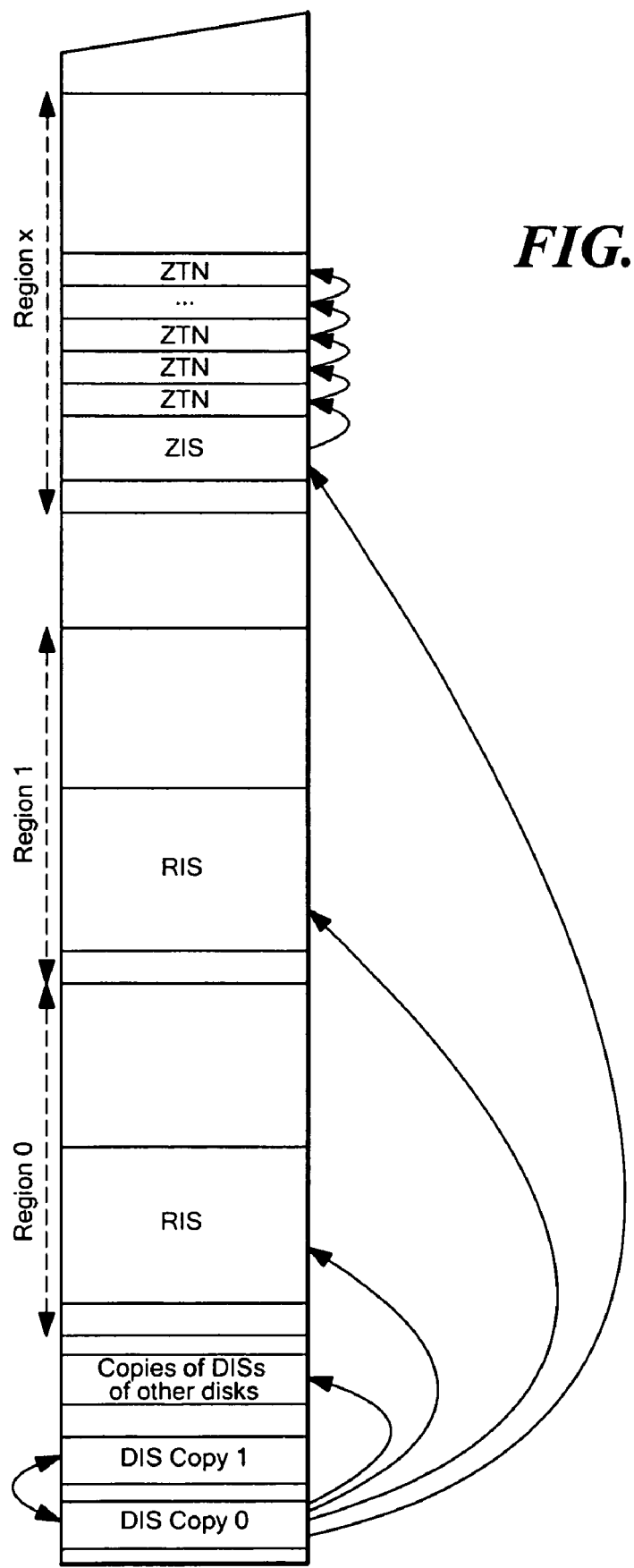
FIG. 16 shows drive layout in accordance with an exemplary embodiment of the invention.

FIG. 16 shows the drive layout in accordance with an exemplary embodiment of the invention. The first two regions are copies of one another. A third (optional) Zones Table Region contains the Zone Tables. In a system with more than one drive, only two of the drives contain a ZTR. In a system with only one drive, two Regions are used to hold the two (mirrored) copies of the ZTR. The DIS contains information on the location of the RIS and the ZIS. Note that the first copy of the RIS does not have to be in Region 0 (e.g., could be located in a different Region if Region 0 contains bad sectors).

The Zones Manager needs to load the Zones Tables on system start up. To do that, it extracts the Region number and offset from the DISs. This will point to the start of the ZIS.

Certain modules (e.g., the CAT Manager) store their control structures and data tables in Zones. All control structures for modules in Layer 3 and higher are referenced from structures that are stored in Zone 0. This means, for example, that the actual CAT (Cluster Allocation Tables) locations are referenced from the data structures stored in Zone 0.

The following table shows the zone 0 information table format:

-continued

| Size | Name | Description |
| --- | --- | --- |
| WORD16 | htllZone | Zone number containing this portion of the hash table |

Figure 17:
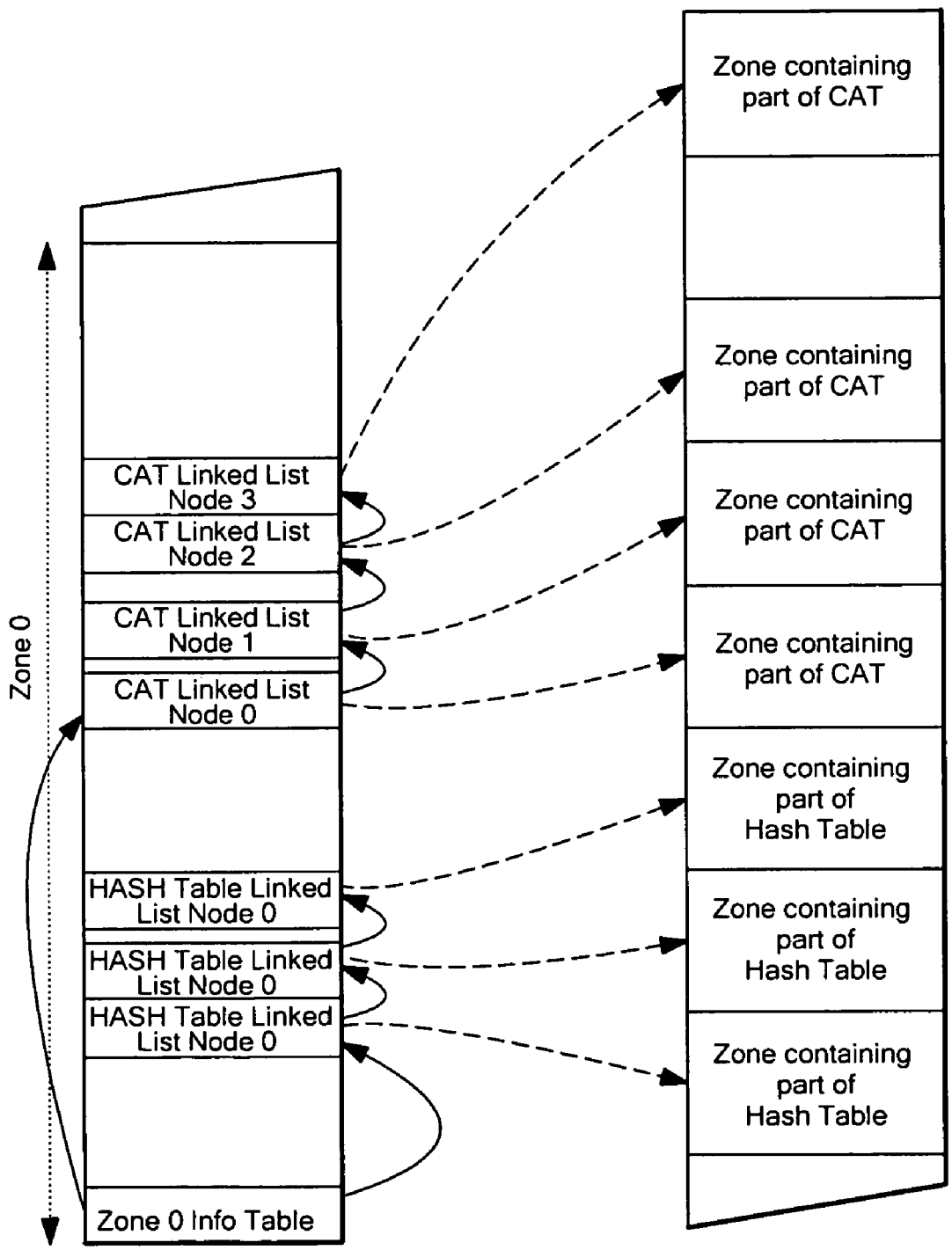
FIG. 17 demonstrates the layout of Zone 0 and how other zones are referenced, in accordance with an exemplary embodiment of the invention.

FIG. 17 demonstrates the layout of Zone 0 and how other zones are referenced, in accordance with an exemplary embodiment of the invention.

As discussed above, a Redundant set is a set of sectors/clusters that provides redundancy for a set of data. Backing up a Region involves copying the contents of a Region to another Region.

In the case of a data read error, the lower level software (Disk Manager or Device Driver) retries the read request two

| Offset | Size | Name | Value/Valid Range | Description |
| --- | --- | --- | --- | --- |
| 0 | WORD64 | zitSignature | | Indisates that this is a ZIT |
| | WORD32 | zitSize | | Size of this structure (bytes) |
| | WORD32 | zitChecksum | | Checksum of this structure |
| | WORD32 | zitVersion | | Version of this structure |
| | WORD32 | zitCATLStartOffset | | Byte offset (within this Zone) of start of CAT linked list |
| | WORD32 | zitCATSize | | Number of nodes in CAT linked list. Equal to number of Zones containing the CAT |
| | WORD64 | zitCATAddressable | | The max LBA supported by the CAT. Effectively the size of the CAT |
| | WORD32 | zitHTStartOffset | | Byte (within this Zone) of the start of the Hash Table linked list |
| | WORD32 | zitHTNumberNodes | | Number of nodes in Hash Table linked list |
| | WORD64 | zitHTSize | | Size of Hash Table data in bytes |

The CAT linked list is a linked list of nodes describing the Zones that contain the CAT. The following table shows the CAT Linked List node format:

| Size | Name | Description |
| --- | --- | --- |
| WORD32 | catllNextEntry | Pointer to next entry in linked list |
| WORD16 | catllCount | Count of this entry |
| WORD16 | catllZone | Zone number containing this portion of the CAT |

Figure 18:
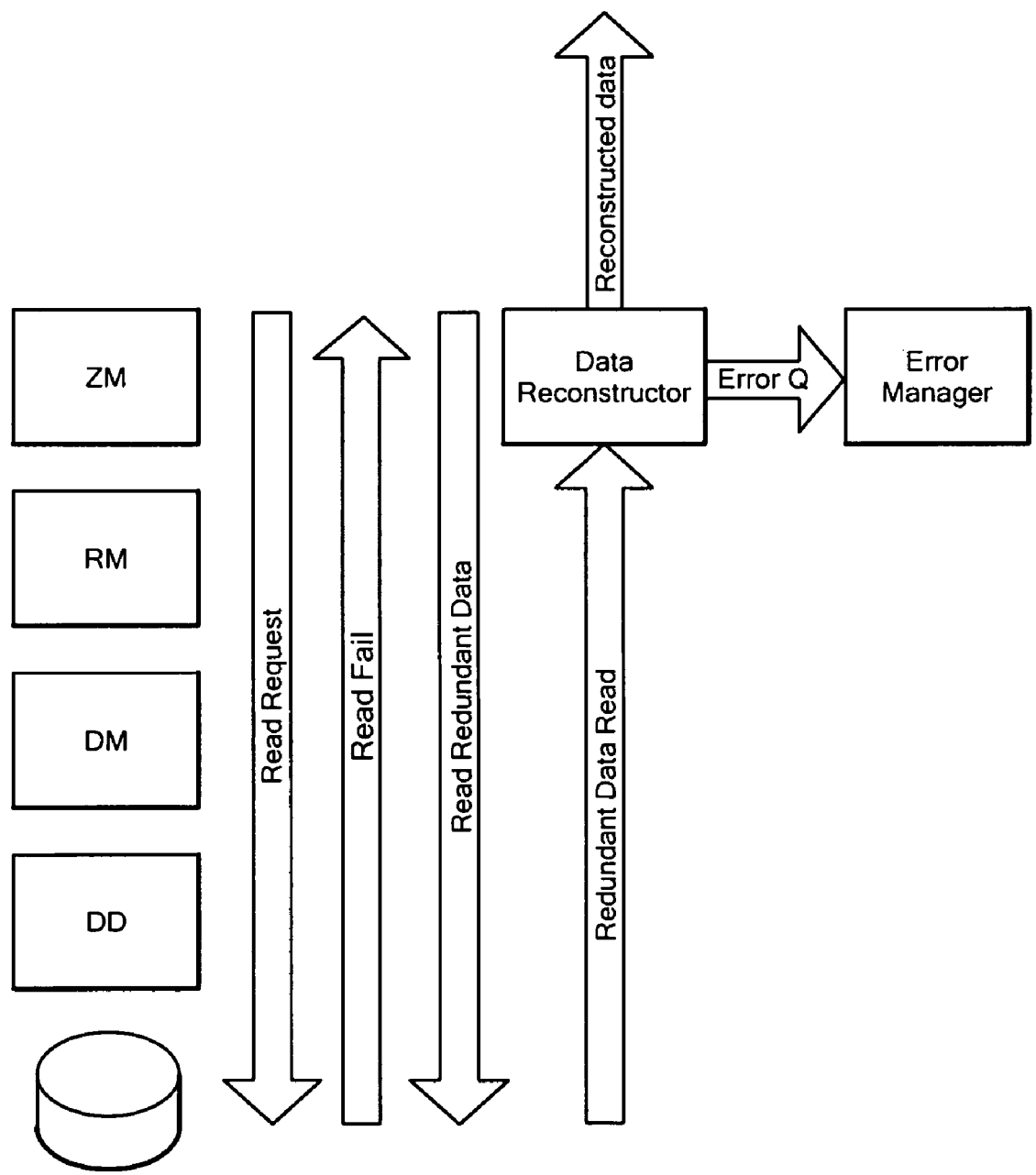
FIG. 18 demonstrates read error handling in accordance with an exemplary embodiment of the invention.

The hash table linked list is a linked list of nodes that describe the Zones which hold the Hash Table. The following table shows the Hash Table Linked List node format:

| Size | Name | Description |
| --- | --- | --- |
| WORD32 | htllNextEntry | Pointer to next entry in linked list |
| WORD16 | htllCount | Count of this entry | additional times after an initial failed attempt. The failure status is passed back up to the Zones Manager. The Zones Manager then attempts to reconstruct the data that is requested (by the read) from the redundant clusters in the disk array. The redundant data can be either a mirrored cluster (for SDM, DDM) or a set of clusters including parity (for a striped implementation). The reconstructed data is then passed up back to the host. If the ZM is unable to reconstruct the data, then a read error is passed up back to the host. The Zones Manager sends an Error Notification Packet to the Error Manager. FIG. 18 demonstrates read error handling in accordance with an exemplary embodiment of the invention.

In the case of a data write error, the lower level software (Disk Manager or Device Driver) retries the write request two additional times after an initial failed attempt. The failure status is passed back up to the Zones Manager. The Zones Manager sends an Error Notification Packet to the Error Manager.

When a data write is performed at this level, the redundancy information is also written to disk. As a result, as long as only one cluster has a write error, a subsequent read will be able to reconstruct the data. If there are multiple disk errors and redundancy information cannot be read or written, then there are at least two possible approaches:

a. Return a write error status to the host. Back up all the Regions associated with the redundant set to newly allocated Regions that do not contain bad sectors.
b. Hold off the write. Back up all the Regions associated with the redundant set to newly allocated Regions that do not contain bad sectors. Subsequently, do the write on the appropriate cluster in the newly allocated Regions (along with all redundancy parts e.g., parity etc.). A separate write queue would be used to contain the writes that have been held off.

Approach (a) is problematic because a write status would likely have already been sent to the host as a result of a successful write of the Journal, so the host may not know that there has been an error. An alternative is to report a failure with a read, but allow a write. A bit in the CAT could be used to track that the particular LBA should return a bad read.

Figure 19:
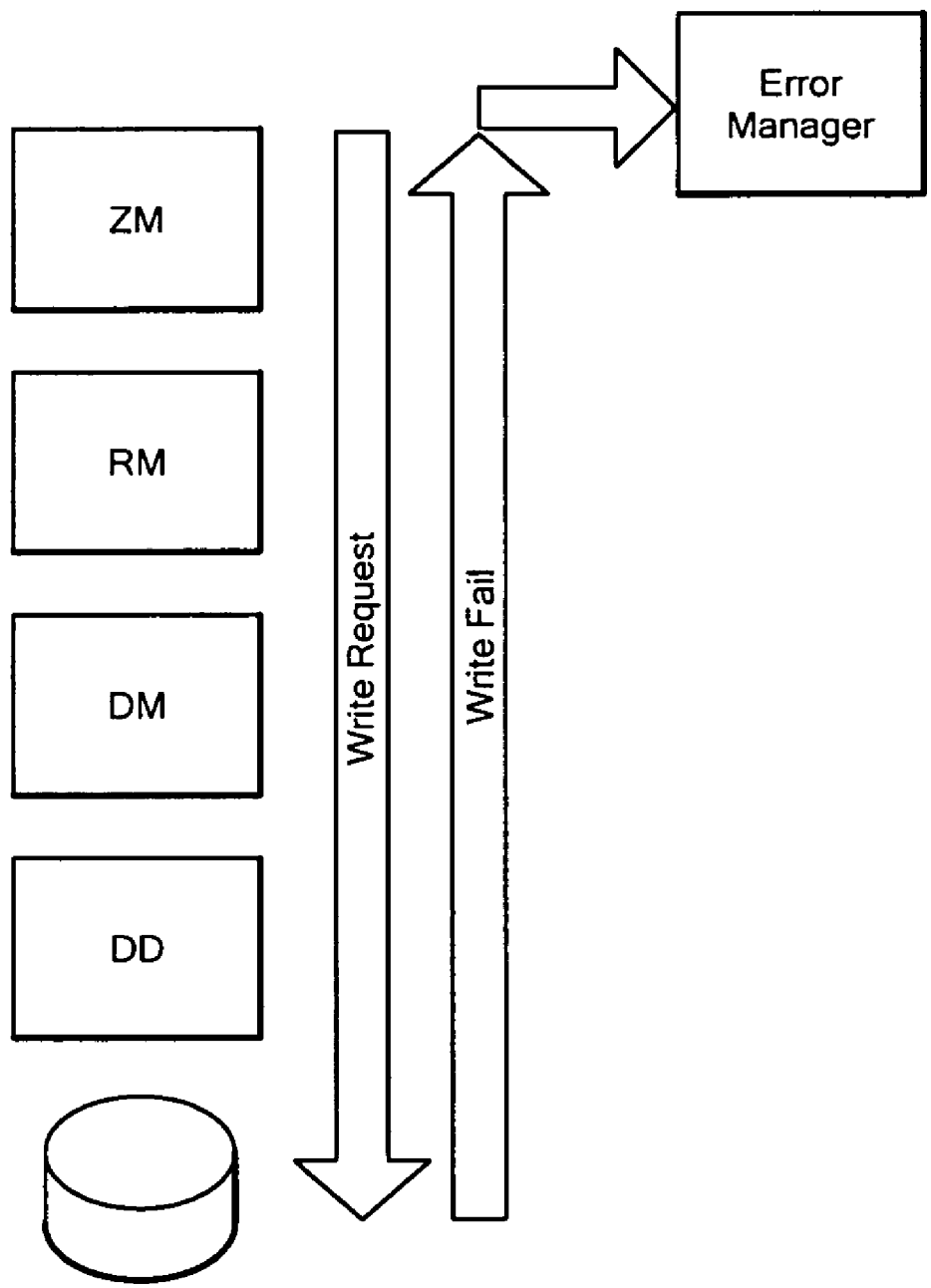
FIG. 19 demonstrates write error handling in accordance with an exemplary embodiment of the invention.

FIG. 19 demonstrates write error handling in accordance with an exemplary embodiment of the invention.

Figure 20:
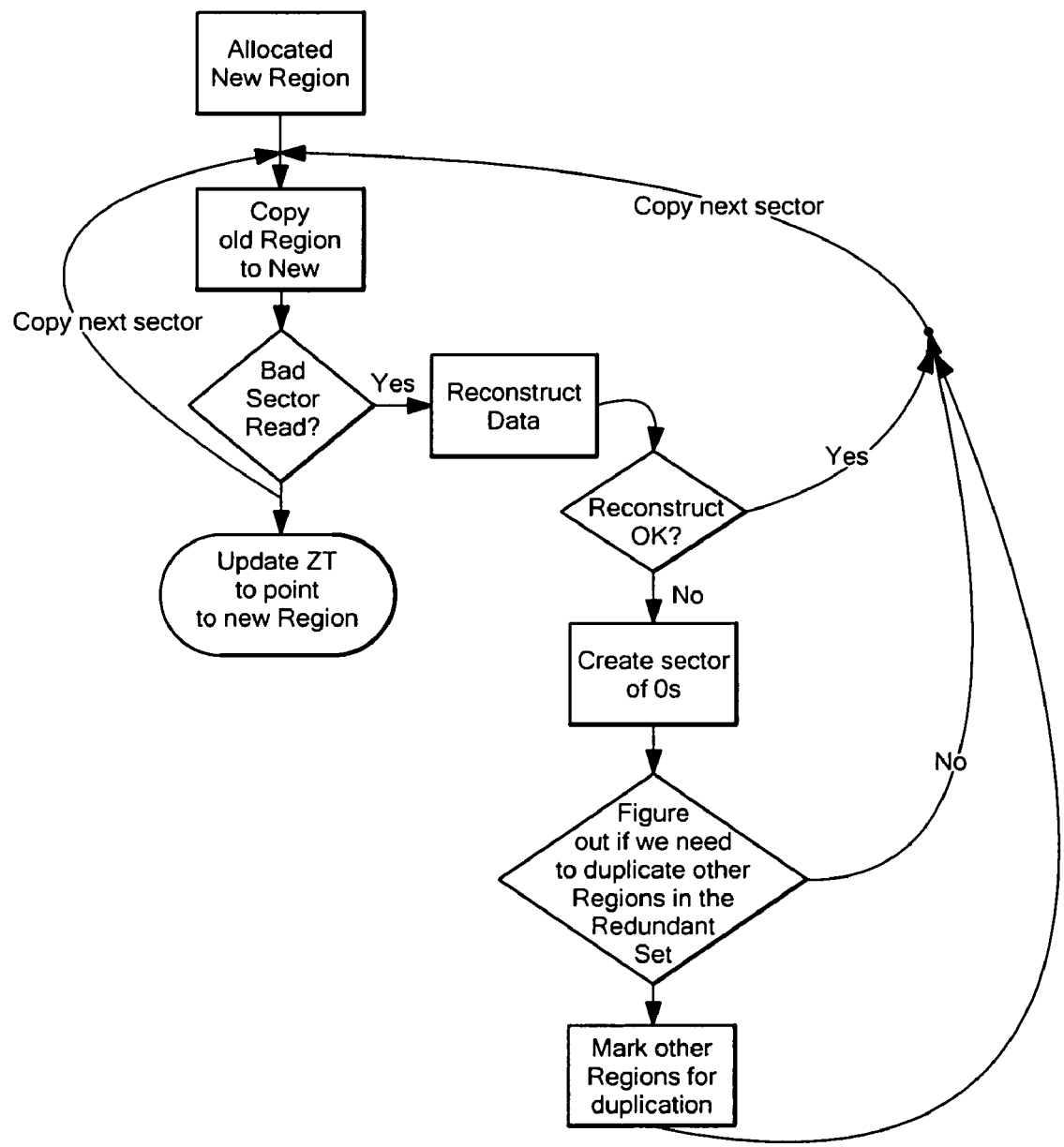
FIG. 20 is a logic flow diagram demonstrating backup of a bad Region by the Error Manager in accordance with an exemplary embodiment of the invention.

The Error Manager (EM) checks the cluster to see if it is really bad. If so, the entire region is considered bad. The contents of the Region are copied over to a newly allocated Region on the same disk. The current Region is then marked BAD. While copying over the Region, the Error Manager will reconstruct data where necessary when it encounters bad sectors. FIG. 20 is a logic flow diagram demonstrating backup of a bad Region by the Error Manager in accordance with an exemplary embodiment of the invention.

If there is a data read error and the Error Manager is unable to reconstruct the data for a given cluster (e.g., as a result of read errors across the redundant set) then zeros will be used in place of the data that cannot be reconstructed. In this case, other Regions (from the same Redundant Set) that contain bad sectors will also have to be backed up. Again, zeros will be used in place of the data that cannot be reconstructed.

Once a copy of the redundant set is made, the EM disables access to the clusters corresponding to this part of the Zone. It then updates the Zones Table to point to the newly allocated Regions. Subsequently, accesses to the clusters are re-enabled.

This exemplary embodiment is designed to support eight snapshots (which allows use of one byte to indicate whether hash/cluster entries are used by a particular snapshot instance). There are two tables involved with snapshots:

1. A per-snapshot CAT table will need to exist to capture the relationship between logical sector addresses and the cluster on the disk that contains the data for that LSA. Ultimately the per-snapshot CAT must be a copy of the CAT at the moment the snapshot was taken.
2. The system hash table, which maps between hash values and a data cluster. The hash function returns the same results regardless of which snapshot instance is being used, and as a result is common across all snapshots. As a result, this table must understand whether a unique cluster is being used by any snapshots. A hash cluster entry can not be freed, or replaced with new data unless there are no snapshots using the hash entry.

There will always be a snapshot that is current and being added to. When a hash entry is created or updated, we will need to apply the current snapshot number to that hash entry. When a snapshot is made, the current snapshot number will be incremented.

Clusters/hash entries that are not longer required by any snapshots are freed by walking through the hash table and find any hash entries with the retiring snapshot bit set and clearing that bit. If the snapshot byte is now zero, the hash entry can be removed from the table and the cluster can be freed.

To prevent collisions with any new entries being added to the hash tree (because the new snapshot number is the same as the retiring snapshot number), only allow 7 snapshots may be permitted to be taken, with the final (eighth) snapshot the one that is being retired. The hash table can be walked as a background activity.

In order to create a snapshot, a second CAT zone could be written whenever the main CAT is being updated. These updates could be queued and the shadow CAT could be updated as another task. In order to snapshot, the shadow CAT becomes the snapshot CAT.

Once the snapshot is done, a background process can be kicked off to copy this snapshot table to a new zone become the new snapshot CAT. A queue could be used so that the shadow CAT queue is not processed until the copy of the CAT had completed. If a failure were to occur before updating the shadow CAT (in which case entries in the queue may be lost), re-shadow from the primary CAT table could be performed before the array is brought online.

Alternatively, when a snapshot is required, a collection of "deltas" plus the initial CAT copy could make up the snapshot. A background task could then reconstitute a full snapshot CAT from this info. This would require little or no downtime to do the snapshot. In the meantime, another set of deltas could be collected for the following snapshot.

As discussed above, a so-called "garbage collector" may be used to free up clusters which are no longer used by the host file system (e.g., when a file is deleted). Generally speaking, garbage collection works by finding free blocks, computing their host LSAs, and locating their CAT entries based on the LSAs. If there is no CAT entry for a particular LSA, then the cluster is already free. If, however, the CAT entry is located, the reference count is decremented, and the cluster is freed if the count hits zero.

One issue with garbage collection is that it may be difficult to distinguish a block that the host filesystem has in use from one that it has previously used and at some point marked free. When the host filesystem writes a block, the storage system allocates a cluster for the data as well as a CAT entry to describe it. From that point on, the cluster will generally appear to be in use, even if the host filesystem subsequently ceases to use its block (i.e., the cluster will still be in use with a valid CAT entry).

For example, certain host filesystems use a bitmap to track its used disk blocks. Initially, the bitmap will indicate all blocks are free, for example, by having all bits clear. As the filesystem is used, the host filesystem will allocate blocks through use of its free block bitmap. The storage system will associate physical storage with these filesystem allocations by allocating clusters and CAT entries as outlined earlier. When the host filesystem releases some blocks back to its free pool, it simply needs to clear the corresponding bits in its free block bitmap. On the storage system, this will generally be manifested as a write to a cluster that happens to contain part of the host's free block bitmap, likely with no I/O to the actual cluster being freed itself (although there might be I/O to the freed cluster, for example, if the host filesystem were running in some enhanced security mode, in which case it would likely write zeros or a crypto strong hash of random data to the cluster in order to reduce the chance that stale cluster contents can be read by an attacker). Furthermore, there is no guarantee that the host filesystem will reuse blocks that it has previously freed when satisfying new allocation requests. Thus, if the host filesystem continues to allocate what from the storage system's point of view are new, i.e. previously unused, blocks then the storage system will quickly run out of free clusters, subject to whatever space can be reclaimed via compression. For example, assuming a filesystem block is 4 k, if the host allocates filesystem blocks 100 through 500, subsequently frees blocks 300 through 500, and then allocates blocks 1000 through 1100, the total filesystem usage will be 300 blocks, and yet the array will have 500 clusters in use.

In an exemplary embodiment of the present invention, the storage system may detect the release of host filesystem disk resources by accessing the host filesystem layout, parsing its free block bitmaps, and using that information to identify clusters that are no longer being used by the filesystem. In order for the storage system to be able to identify unused clusters in this way, the storage system must be able to locate and understand the free block bitmaps of the filesystem. Thus, the storage system will generally support a predetermined set of filesystems for which it "understands" the inner working sufficiently to locate and utilize the free block bitmaps. For unsupported filesystems, the storage system would likely be unable to perform garbage collection and should therefore only advertise the real physical size of the array in order to avoid being overcommitted.

In order to determine the filesystem type (e.g., NTFS, FAT, ReiserFS, ext3), the filesystem's superblock (or an equivalent structure) needs to be located. To find the superblock, the partition table will be parsed in an attempt to locate the OS partition. Assuming the OS partition is located, the OS partition will be parsed in an attempt to locate the superblock and thereby identify the filesystem type. Once the filesystem type is known, the layout can be parsed to find the free block bitmaps.

In order to facilitate searching for free blocks, historical data of the host filesystem bitmap can be kept, for example, by making a copy of the free block bitmap that can be stored in a private, non-redundant zone and performing searches using the copy. Given the size of the bitmap, information may be kept for a relatively small number of clusters at a time rather than for the whole bitmap. When a garbage collection is performed, the current free block bitmap can be compared, cluster-by-cluster, with the historical copy. Any bitmap entries transitioning from allocated to free can be identified, allowing the scavenging operation to be accurately directed to clusters that are good candidates for reclamation. As each bitmap cluster is processed, the historical copy can be replaced with the current copy to maintain a rolling history of bitmap operations. Over time the copy of the free block bitmap will become a patchwork of temporally disjoint clusters, but since the current copy will always be used to locate free entries, this does not cause any problems.

Under certain conditions, there could be a race condition regarding the free block bitmap, for example, if the host filesystem allocates disk blocks using its free block bitmap, then writes its data blocks, then flushes the modified bitmap back to disk. In such a case, the garbage collector might free a cluster even though the filesystem is using the cluster. This could lead to filesystem corruption. The storage system should be implemented to avoid or handle such a condition.

Because garbage collection can be a fairly expensive operation, and since even lightweight scavenging will consume back-end I/O bandwidth, garbage collection should not be overused. The garbage collector should be able to run in several modes ranging from a light background lazy scavenge to an aggressive heavyweight or even high priority scavenge. For example, the garbage collector could be run lightly when 30% of space is used or once per week at a minimum, run slightly more heavily when 50% of space is used, and run at a full high-priority scavenge when 90% or more of disk space is used. The aggressiveness of the garbage collector could be controlled by limiting it to a target number of clusters to reclaim and perhaps a maximum permissible I/O count for each collection run. For example, the garbage collector could be configured to reclaim 1 GB using no more than 10,000 I/Os. Failure to achieve the reclaim request could be used as feedback to the collector to operate more aggressively next time it is run. There may also be a "reclaim everything" mode that gives the garbage collector permission to parse the entire host filesystem free block bitmap and reclaim all blocks that it possibly can. This might be done as a last ditch attempt to reclaim clusters when the array is (almost) completely full. The garbage collector may be run periodically to apply its rules and may or may not decide to perform a scavenge operation. The scavenge operation should also be able to be explicitly requested from another module, for example the region manager when it is struggling to find clusters to build a region.

The garbage collection function can be tied into the status indicator mechanism. For example, at some point, the storage system might be in a "red" condition, although an ongoing garbage collection operation might free up enough space to erase the "red" condition. Additional indicator states could be employed to show related status information (e.g., the red indicator light might be made to blink to indicate that a garbage collection operation is ongoing).

Figure 21:
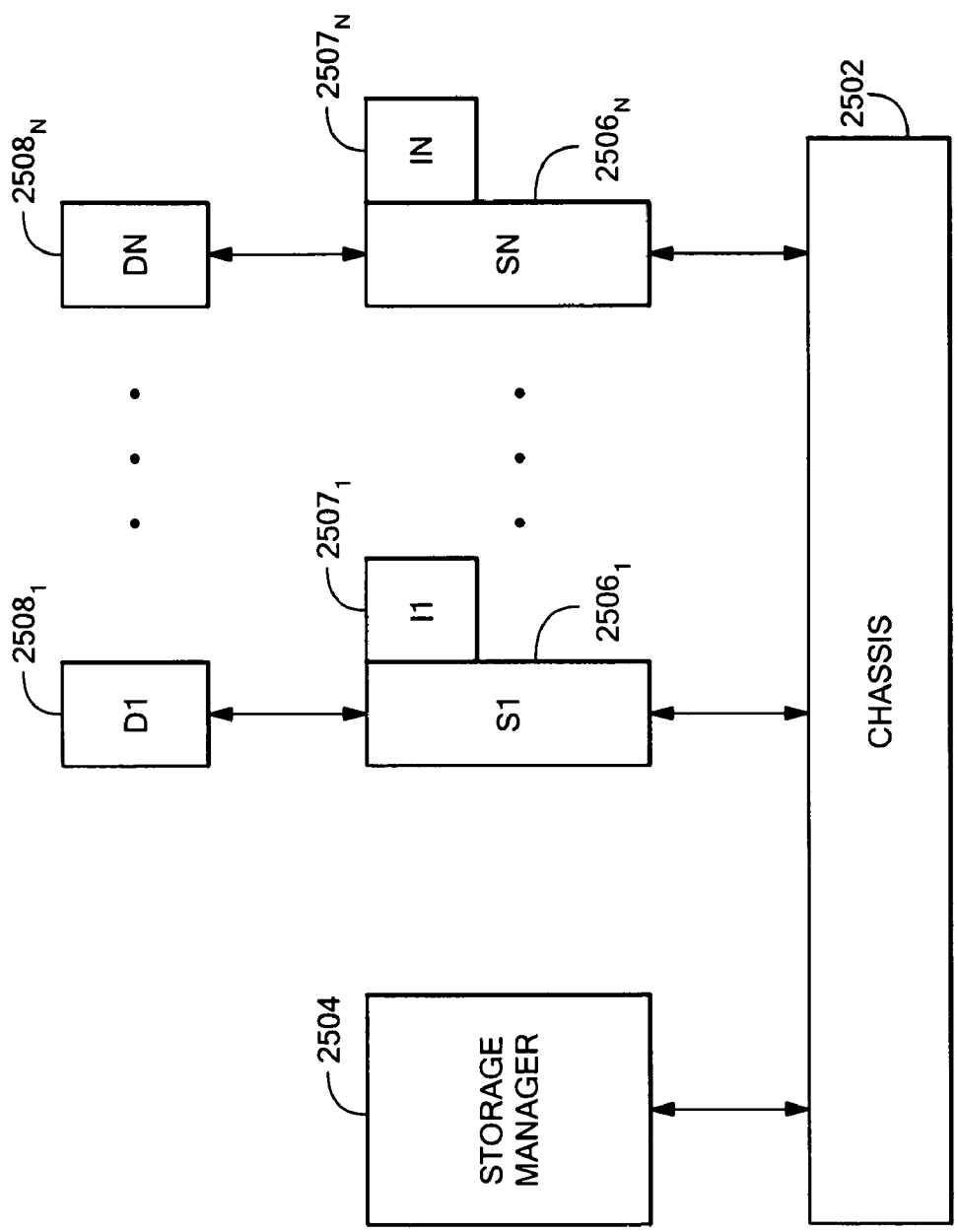
FIG. 21 is a schematic block diagram showing the relevant components of a storage array in accordance with an exemplary embodiment of the present invention.

FIG. 21 is a schematic block diagram showing the relevant components of a storage array in accordance with an exemplary embodiment of the present invention. Among other things, the storage array includes a chassis 2502 over which a storage manager 2504 communicates with a plurality of storage devices $2508_1$-$2508_N$, which are coupled to the chassis respectively through a plurality of slots $2506_1$-$2506_N$. Each slot $2506_1$-$2506_N$ may be associated with one or more indicators $2507_1$-$2507_N$. Among other things, the storage manager 2504 typically includes various hardware and software components for implementing the functionality described above. Hardware components typically include a memory for storing such things as program code, data structures, and data as well as a microprocessor system for executing the program code.

Virtual Hot Spare

As discussed above, in many storage systems, a hot spare storage device will be maintained in a ready state so that it can be brought online quickly in the event another storage device fails. In certain embodiments of the present invention, rather than maintaining a physically separate hot spare, a virtual hot spare is created from unused storage capacity across a plurality of storage devices. Unlike a physical hot spare, this unused storage capacity is available if and when a storage device fails for storage of data recovered from the remaining storage device(s).

The virtual hot spare feature requires that enough space be available on the array to ensure that data can be re-laid out redundantly in the event of a disk failure. Thus, on an ongoing basis, the storage system typically determines the amount of unused storage capacity that would be required for implementation of a virtual hot spare (e.g., based on the number of storage devices, the capacities of the various storage devices, the amount of data stored, and the manner in which the data is stored) and generates a signal if additional storage capacity is needed for a virtual hot spare (e.g., using green/yellow/red lights to indicate status and slot, substantially as described above). As zones are allocated, a record is kept of how many regions are required to re-layout that zone on a per disk basis. The following table demonstrates a virtual hot spare with four drives used:

|      |              | Stored   |                                                 | Regions required if disk fails |        |        |        |
|------|--------------|----------|-------------------------------------------------|--------|--------|--------|--------|
| Zone | Type         | On Disks | Comments                                        | Disk 0 | Disk 1 | Disk 2 | Disk 3 |
| 2    | Dual Drive Mirror | 0, 1     | Reconstruct on disk 2 or 3 if 0 or 1 fails     | 12     | 12     | 0      | 0      |
| 3    | Dual Drive Mirror | 0, 3     | Reconstruct on disk 1 or 2 if 1 or 2 fails     | 12     | 0      | 0      | 12     |
| 5    | Triple Drive Stripe | 1, 2, 3  | Reconstruct on disk 0 if 1, 2, or 3 fails   | 0      | 6      | 6      | 6      |
| 10   | Four Drive Stripe | 0, 1, 2, 3 | Convert to triple drive strip across other three disks | 2, 2, 2 | 2, 2, 2 | 2, 2, 2 | 2, 2, 2 |

The following table demonstrates a virtual hot spare with three drives used:

|      |              | Stored   |                        | Regions required if disk fails | | |
|------|--------------|----------|------------------------|--------|--------|--------|
| Zone | Type         | On Disks | Comments               | Disk 0 | Disk 1 | Disk 2 |
| 2    | Dual Drive Mirror | 0, 1 | Reconstruct on disk 3 | 12     | 12     | 0      |
| 3    | Dual Drive Mirror | 0, 3 | Reconstruct on disk 1 | 12     | 0      | 12     |
| 5    | Triple Drive Stripe | 1, 2, 3 | Convert to dual drive mirror | 6, 6 | 6, 6 | 6, 6 |

In this exemplary embodiment, virtual hot spare is not available on an array with only 1 or 2 drives. Based on the information for each zone and the number of disks in the array, the array determines a re-layout scenario for each possible disk failure and ensure that enough space is available on each drive for each scenario. The information generated can be fed back into the re-layout engine and the zone manager so that the data can be correctly balanced between the data storage and the hot spare feature. Note that the hot spare feature requires enough spare working space regions on top of those calculated from the zone layout data so that re-layout can occur.

Figure 22:
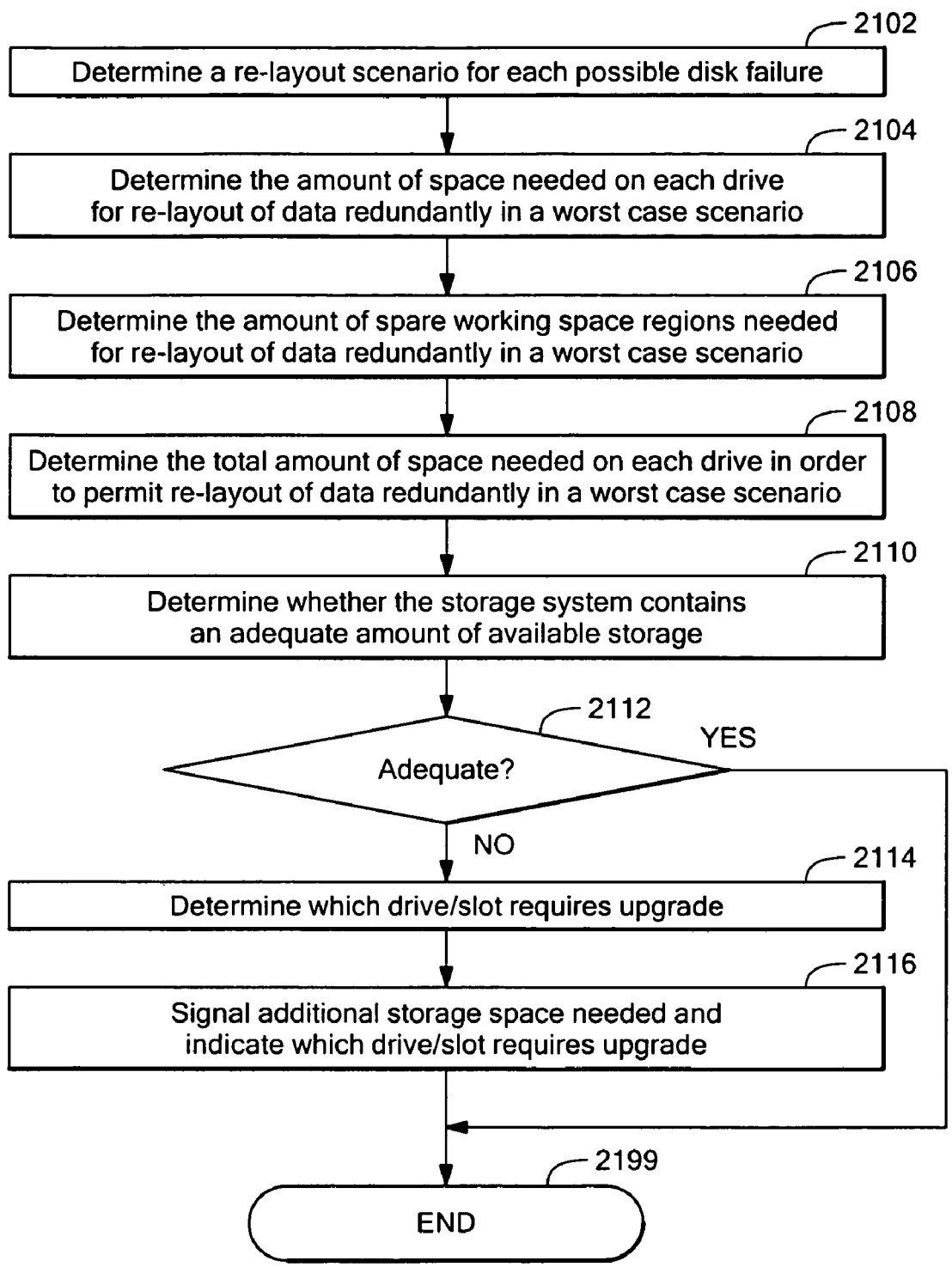
FIG. 22 is a logic flow diagram showing exemplary logic for managing a virtual hot spare in accordance with an exemplary embodiment of the present invention.

FIG. 22 is a logic flow diagram showing exemplary logic for managing a virtual hot spare in accordance with an exemplary embodiment of the present invention. In block 2102, the logic determines a re-layout scenario for each possible disk failure. In block 2104, the logic determines the amount of space needed on each drive for re-layout of data redundantly in a worst case scenario. In block 2106, the logic determines the amount of spare working space regions needed for re-layout of data redundantly in a worst case scenario. In block 2108, the logic determines the total amount of space needed on each drive in order to permit re-layout of data redundantly in a worst case scenario (essentially the sum of the amount of space needed for re-layout and the amount of spare working space regions needed). In block 2110, the logic determines whether the storage system contains an adequate amount of available storage. If there is an adequate amount of available storage (YES in block 2112), then the logic iteration terminates in block 2199. If, however, there is an inadequate amount of available storage (NO in block 2112), then the logic determines which drive/slot requires upgrade, in block 2114. Then, in block 2116, the logic signals that additional storage space is needed and indicates which drive/slot requires upgrade. The logic iteration terminates in block 2199.

Figures 23, 24, 25:
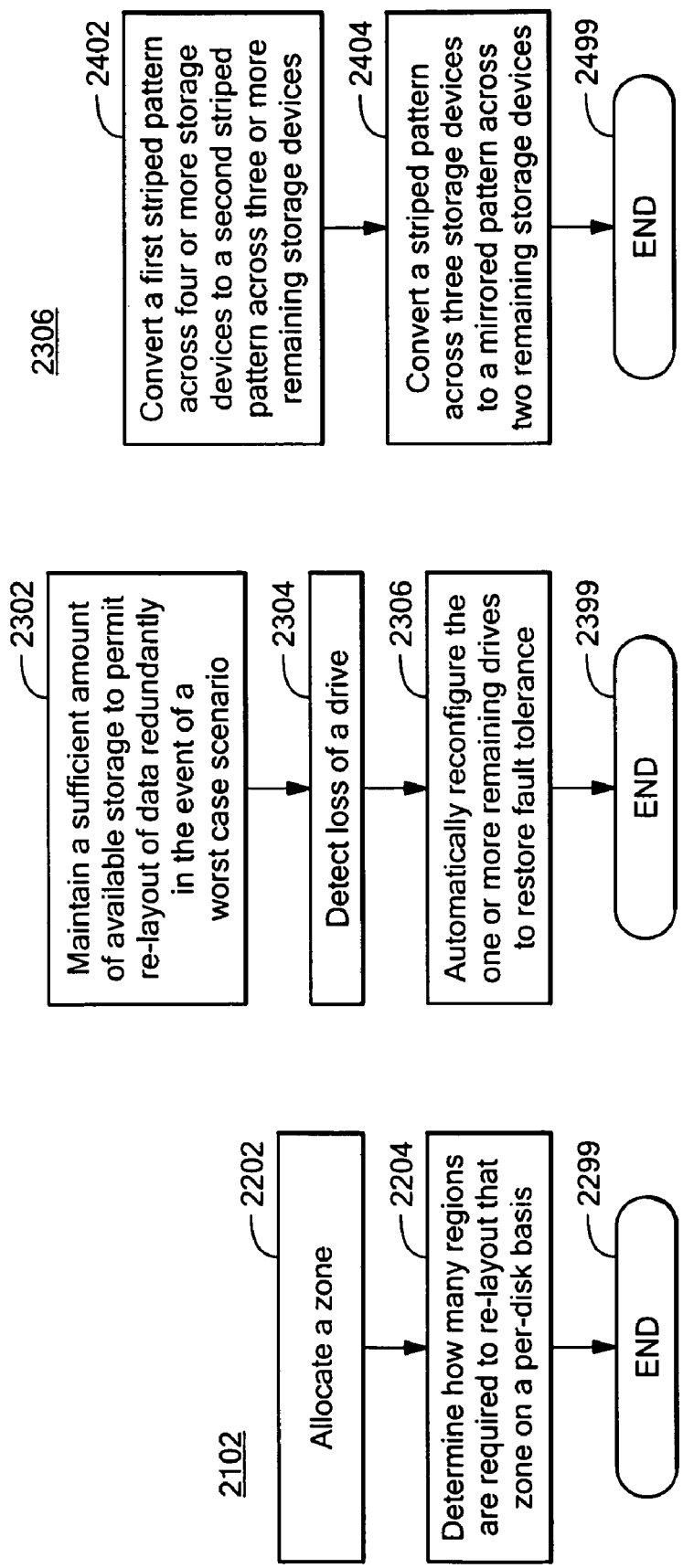
FIG. 23 is a logic flow diagram showing exemplary logic for determining a re-layout scenario for each possible disk failure, as in block 2102 of FIG. 22, in accordance with an exemplary embodiment of the present invention.
FIG. 24 is a logic flow diagram showing exemplary logic for invoking the virtual hot spare functionality in accordance with an exemplary embodiment of the present invention.
FIG. 25 is a logic flow diagram showing exemplary logic for automatically reconfiguring the one or more remaining drives to restore fault tolerance for the data, as in block 2306 of FIG. 24, in accordance with an exemplary embodiment of the present invention.

FIG. 23 is a logic flow diagram showing exemplary logic for determining a re-layout scenario for each possible disk failure, as in block 2102 of FIG. 22, in accordance with an exemplary embodiment of the present invention. In block 2202, the logic allocates a zone. Then, in block 2204, the logic determines how many regions are required to re-layout that zone on a per-disk basis. The logic iteration terminates in block 2299.

FIG. 24 is a logic flow diagram showing exemplary logic for invoking the virtual hot spare functionality in accordance with an exemplary embodiment of the present invention. In block 2302, the logic maintains a sufficient amount of available storage to permit re-layout of data redundantly in the event of a worst case scenario. Upon determining loss of a drive (e.g., removal or failure), in block 2304, the logic automatically reconfigures the one or more remaining drives to restore fault tolerance for the data, in block 2306. The logic iteration terminates in block 2399.

FIG. 25 is a logic flow diagram showing exemplary logic for automatically reconfiguring the one or more remaining drives to restore fault tolerance for the data, as in block 2306 of FIG. 24, in accordance with an exemplary embodiment of the present invention. In block 2402, the logic may convert a first striped pattern across four or more storage devices to a second striped pattern across three or more remaining storage devices. In block 2404, the logic may convert a striped pattern across three storage devices to a mirrored pattern across two remaining storage devices. Of course, the logic may convert patterns in other ways in order to re-layout the data redundantly following loss of a drive. The logic iteration terminates in block 2499.

With reference again to FIG. 21, the storage manager 2504 typically includes appropriate components and logic for implementing the virtual hot spare functionality as described above.

Dynamic Upgrade

The logic described above for handling dynamic expansion and contraction of storage can be extended to provide a dynamically upgradeable storage system in which storage devices can be replaced with a larger storage devices as needed, and existing data is automatically reconfigured across the storage devices in such a way that redundancy is maintained or enhanced and the additional storage space provided by the larger storage devices will be included in the pool of available storage space across the plurality of storage devices. Thus, when a smaller storage device is replaced by a larger storage device, the additional storage space can be used to improve redundancy for already stored data as well as to store additional data. Whenever more storage space is needed, an appropriate signal is provided to the user (e.g., using green/yellow/red lights substantially as described above), and the user can simply remove a storage device and replace it with a larger storage device.

Figure 26:
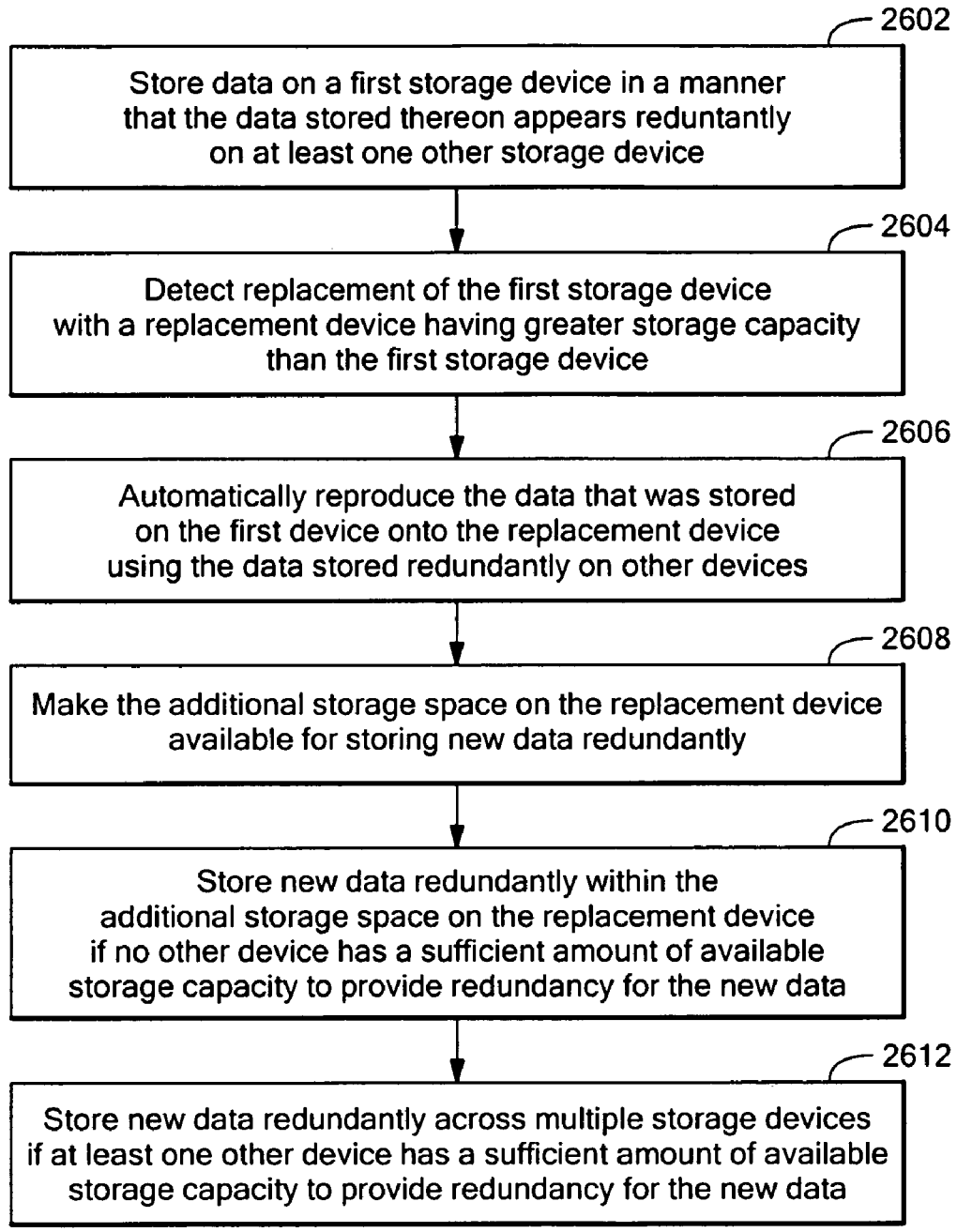
FIG. 26 is a logic flow diagram showing exemplary logic for upgrading a storage device, in accordance with an exemplary embodiment of the present invention.

FIG. 26 is a logic flow diagram showing exemplary logic for upgrading a storage device, in accordance with an exemplary embodiment of the present invention. In block 2602, the logic stores data on a first storage device in a manner that the data stored thereon appears redundantly on other storage devices. In block 2604, the logic detects replacement of the first storage device with a replacement device having greater storage capacity than the first storage device. In block 2606, the logic automatically reproduces the data that was stored on the first device onto the replacement device using the data stored redundantly on other devices. In block 2608, the logic makes the additional storage space on the replacement device available for storing new data redundantly. In block 2610, the logic may store new data redundantly within the additional storage space on the replacement device if no other device has a sufficient amount of available storage capacity to provide redundancy for the new data. In block 2612, the logic may store new data redundantly across multiple storage devices if at least one other device has a sufficient amount of available storage capacity to provide redundancy for the new data.

With reference again to FIG. 21, the storage manager 2504 typically includes appropriate components and logic for implementing the dynamic upgrade functionality as described above.

Miscellaneous

Embodiments of the present invention may be employed to provide storage capacity to a host computer, e.g., using a peripheral connect protocol in the manner described in my U.S. Provisional Patent Application No. 60/625,495, which was filed on Nov. 5, 2004 in the name of Geoffrey S. Barrall, and is hereby incorporated herein by reference in its entirety.

It should be noted that a hash algorithm may not produce hash values that are strictly unique. Thus, is it conceivable for the hash algorithm to generate the same hash value for two chunks of data having non-identical content. The hash function (which generally incorporates the hash algorithm) typically includes a mechanism for confirming uniqueness. For example, in an exemplary embodiment of the invention as described above, if the hash value for one chunk is different than the hash value of another chunk, then the content of those chunks are considered to be non-identical. If, however, the hash value for one chunk is the same as the hash value of another chunk, then the hash function might compare the contents of the two chunks or utilize some other mechanism (e.g., a different hash function) to determine whether the contents are identical or non-identical.

It should be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

This application is related to the following United States Patent Applications, which are being filed on even date herewith and are hereby incorporated herein by reference in their entireties:

Ser. No. 11/267,938 entitled Dynamically Expandable and Contractible Fault-Tolerant Storage System Permitting Variously Sized Storage Devices and Method;

Ser. No. 11/267,836 entitled Dynamically Upgradeable Fault-Tolerant Storage System Permitting Variously Sized Storage Devices and Method; and Ser. No. 11/267,963 entitled Dynamically Expandable and Contractible Fault-Tolerant Storage System With Virtual Hot Spare.

The present invention may be embodied in other specific forms without departing from the true scope of the invention. The described embodiments are to be considered in all respects only as illustrative and not restrictive.

What is claimed is:

1. A method for indicating the condition of a storage system having an array of storage devices in which data may be stored using various data storage patterns, the array having a plurality of slots, each slot in the array being associated with an indicator, the method comprising:

in a storage manager operably coupled to the array of storage devices, determining, when all of the storage devices are functioning, whether additional storage capacity is recommended based on the amount of unused storage available in each of the array of storage devices and the data storage patterns in these storage devices; and if such storage capacity is recommended, indicating which slot in the array should be populated with additional storage capacity by:

setting the indicator associated with a given slot to a first state, if the given slot should be populated with additional storage capacity because the storage system has reached a fail condition in which there is not enough storage space to maintain redundant data storage;

setting the indicator associated with the given slot to a second state, if the given slot should be populated with additional storage capacity because the storage system has enough storage space to maintain redundant data storage but is approaching the fail condition; and setting the indicator associated with the given slot to a third state, if the given slot should not be populated with additional storage capacity because the storage system has enough storage space to maintain redundant data storage and is not approaching the fail condition, wherein the indicators are used collectively to indicate the storage system condition.

2. A method according to claim 1, wherein each indicator is a multiple color light, and wherein each condition is associated with a different color.

3. A method according to claim 2, wherein the multiple color light is a three color light, and wherein:
the first state is red;
the second state is yellow; and
the third state is green.

4. A storage system comprising:

a number of storage devices in which data may be stored using various data storage patterns;

a plurality of storage device slots for receiving storage devices of various storage capacities including the number of storage devices, each slot being associated with an indicator; and a storage manager operably coupled to the number of storage devices and to the plurality of storage device slot indicators, the storage manager:

determining, when all of the storage devices are functioning, whether additional storage capacity is recommended based on the amount of unused storage available in each of the number of storage devices and the data storage patterns in these storage devices, and if such storage capacity is recommended, indicating which slot should be populated with additional storage capacity by:

setting the indicator associated with a given slot to a first state, if the given slot should be populated with additional storage capacity because the storage system has reached a fail condition in which there is not enough storage space to maintain redundant data storage;

setting the indicator associated with the given slot to a second state, if said the given should be populated with additional storage capacity because the storage system has enough storage space to maintain redundant data storage but is approaching the fail condition; and setting the indicator associated with the given slot to a third state, if the given slot should not be populated with additional storage capacity because the storage system has enough storage space to maintain redundant data storage and is not approaching the fail condition, wherein the indicators are used collectively to indicate the storage system condition.

5. A storage system according to claim 4, wherein each indicator is a multiple color light, and wherein each state is associated with a different color.

6. A storage system according to claim 5, wherein the multiple color light is a three color light, and wherein:
the first state is red;
the second state is yellow; and
the third state is green.

* * * * *